US009633592B2

(12) United States Patent
Kumeta et al.

(10) Patent No.: US 9,633,592 B2
(45) Date of Patent: Apr. 25, 2017

(54) DISPLAY APPARATUS AND METHOD OF DRIVING THE SAME

(71) Applicant: SAMSUNG DISPLAY CO., LTD., Yongin, Gyeonggi-Do (KR)

(72) Inventors: Masayuki Kumeta, Yokohama (JP); Ryo Ishii, Yokohama (JP); Takeshi Okuno, Yokohama (JP); Eiji Kanda, Yokohama (JP); Daisuke Kawae, Yokohama (JP); Naoaki Komiya, Yokohama (JP)

(73) Assignee: SAMSUNG DISPLAY CO., LTD., Yongin, Gyeonggi-Do (KR)

(*) Notice: Subject to any disclaimer, the term of this patent is extended or adjusted under 35 U.S.C. 154(b) by 115 days.

(21) Appl. No.: 14/503,595

(22) Filed: Oct. 1, 2014

(65) Prior Publication Data

US 2015/0097871 A1 Apr. 9, 2015

(30) Foreign Application Priority Data

Oct. 4, 2013 (JP) ................................ 2013-209368
Oct. 24, 2013 (JP) ................................ 2013-220859

(51) Int. Cl.

*G06F 3/045* (2006.01)
*G09G 3/20* (2006.01)
*G09G 3/3225* (2016.01)
*G09G 3/3275* (2016.01)

(52) U.S. Cl.

CPC ............. *G09G 3/2003* (2013.01); *G09G 3/20* (2013.01); *G09G 3/3225* (2013.01); *G09G 3/3275* (2013.01); *G09G 2310/027* (2013.01); *G09G 2320/0223* (2013.01)

(58) Field of Classification Search

CPC ......... G09G 2300/0861; G09G 3/2003; G09G 3/3233; G09G 2320/0276; G09G 2320/045; G09G 2320/02; G06F 3/0412; G06F 3/044

See application file for complete search history.

(56) References Cited

U.S. PATENT DOCUMENTS 5,854,615 A 12/1998 Hush
6,501,454 B1 12/2002 Ozawa et al.
8,405,644 B2 * 3/2013 Kato .................... G09G 3/3677 345/100

(Continued)

FOREIGN PATENT DOCUMENTS

EP 0767449 B1 10/2010
EP 2400484 A1 12/2011

(Continued)

*Primary Examiner* — Andrew Sasinowski
*Assistant Examiner* — Gerald Oliver
(74) *Attorney, Agent, or Firm* — Lee & Morse P.C.

(57) ABSTRACT

A display device includes an acquiring circuit, a calculator, and a delay controller. The acquiring circuit acquires a gray scale voltage of a gray scale value of a pixel. The calculator calculates a first delay correction value based on a voltage currently retained on a data signal line to which the gray scale voltage is output and a gray scale voltage to be subsequently output to the data signal line. The delay controller determines a timing when the gray scale voltage is to be output to the data signal line based on the first delay correction value.

20 Claims, 30 Drawing Sheets

(56) References Cited

U.S. PATENT DOCUMENTS

| | | | | |
|---|---|---|---|---|
| 2005/0001803 | A1* | 1/2005 | Morita | G09G 3/3648 345/89 |
| 2005/0001863 | A1* | 1/2005 | Farr | B41J 2/17566 347/7 |
| 2005/0280612 | A1* | 12/2005 | Yamamoto | G09G 3/22 345/75.2 |
| 2007/0222481 | A1* | 9/2007 | Ishii | G09G 3/3688 327/12 |
| 2008/0001880 | A1* | 1/2008 | Ki-Min | G09G 3/2007 345/89 |
| 2009/0079678 | A1* | 3/2009 | Ozawa | G09G 3/3233 345/77 |
| 2009/0322798 | A1* | 12/2009 | Lin | G09G 3/2074 345/690 |
| 2013/0321253 | A1* | 12/2013 | Park | G09G 3/3611 345/100 |
| 2014/0184522 | A1* | 7/2014 | Ma | G06F 3/044 345/173 |

FOREIGN PATENT DOCUMENTS

| | | |
|---|---|---|
| JP | 08-146919 | 6/1996 |
| JP | 2003-162262 | 6/2003 |
| JP | 2006-154225 | 6/2006 |
| JP | 2006-301413 | 11/2006 |
| JP | 2009-145492 | 7/2009 |
| JP | 2012-237806 | 12/2012 |
| WO | WO-2011/058750 A1 | 5/2011 |

* cited by examiner

DISPLAY APPARATUS AND METHOD OF DRIVING THE SAME

CROSS-REFERENCE TO RELATED APPLICATIONS

Japanese Application No. 2013-209368, filed on Oct. 4, 2013, and Japanese Application No. 2013-220859, filed on Oct. 24, 2013, and entitled: "Display Apparatus and Method of Driving the Same," are incorporated by reference herein in their entirety.

BACKGROUND

1. Field

One or more embodiments described herein relate to a display apparatus and a method for driving a display apparatus.

2. Description of the Related Art

A variety of large-scale, high-resolution displays have been developed. Examples include liquid crystal displays and an organic EL displays. In these displays, the signal lines for controlling the pixels of the display have increased resistance. The increase in resistance may cause signals from a driver to be delayed. This delay may increase as the distance between the driver and the pixels increase.

When a gray scale voltage that determines a gray scale value to be emitted is written at a pixel, a significant amount of time is taken to reach a target gray scale voltage due to the increase in delay. As a result, the gray scale voltage written at each pixel may not reach the target gray scale voltage. This may lower gray scale expressivity, which, for example, may depend on a distance from the driver.

Increasing the update time of a gray scale voltage for each pixel may approximate the target gray scale voltage. Under these circumstances, it may be possible to reduce the aforementioned delay phenomenon. However, in a high-resolution display, the update time of a gray scale voltage is short, which causes an increase in adverse effects caused by the delay phenomenon.

SUMMARY

In accordance with one embodiment, a display device includes a circuit to acquire a gray scale voltage of a gray scale value of a pixel; a calculator to calculate a first delay correction value based on a voltage currently retained on a data signal line to which the gray scale voltage is output and a gray scale voltage to be subsequently output to the data signal line; and a delay controller to determine a timing when the gray scale voltage is to be output to the data signal line based on the first delay correction value.

The calculator may calculate a second delay correction value based on a position of a scan line corresponding to the pixel, wherein the delay controller may determine the timing when the gray scale voltage is output to the data signal line based on the first and second delay correction values. The calculator may calculate the second delay correction value based on an RC time constant of the data signal line. The currently retained voltage on the data signal line may correspond to a voltage that depends on a gray scale voltage previously output based on a current data signal line.

The display device may include a pre-charge control circuit to output a pre-charge voltage to the data signal line before the gray scale voltage is output, wherein the currently retained voltage on the data signal line may correspond to the pre-charge voltage.

In accordance with another embodiment, a method for driving a display device includes acquiring a gray scale voltage indicating a gray scale value of a pixel; calculating a first delay correction value based on a voltage currently retained on a data signal line to which the gray scale voltage is output and a current gray scale voltage; and determining a timing when the gray scale voltage is output to the data signal line based on the first delay correction value.

The method may include calculating a second delay correction value based on a position of a scan line corresponding to the pixel to which the gray scale voltage is output, wherein a timing when the gray scale voltage is output to the data signal line is based on the first and second delay correction values. Calculating the second delay correction value may be performed based on an RC time constant of the data signal line. The currently retained voltage on the data signal line may correspond to a voltage that depends on a gray scale voltage previously output based on a current data signal line. The method may include outputting a pre-charge voltage to the data signal line before the gray scale voltage is output, wherein the currently retained voltage on the data signal line corresponds to the pre-charge voltage.

In accordance with another embodiment, a method for driving an image display device delaying timings when gray scale data signals are respectively supplied to at least two data lines based on a distance between a scan driver and each of the at least two data lines, wherein the timings are delayed by different amounts. The method may include delaying timings when gray scale data signals are respectively provided to the at least two data lines based on a time constant, wherein the time constant may be based on a resistance value of a scan line and a capacitance value due to capacitive coupling.

The timings may be delayed by a data driver including a plurality of delay control circuits connected in series, and the method may include determining an output timing signal indicating a timing when a gray scale data signal is supplied to each of the at least two data lines, the output timing signal determined by one of the delay control circuits. The one of the delay control circuits may select a delay time of an output signal to an input signal.

The method may include providing a dummy scan line, intersecting the at least two data lines, with a pulse signal which ascends and descends according to an ascending transition and a descending transition of a selection signal supplied to the scan line, acquiring a signal on the dummy scan line between the scan driver and an intersection of the dummy scan line and each of the at least two data lines, and determining a timing when a gray scale data signal is supplied to each of the at least two data lines according to a level variation in the signal.

In accordance with another embodiment, an image display device includes a scan line connected to a scan driver; and a data driver connected to at least two data lines which are connected to a data driver, the at least two data lines arranged to intersect the scan line, wherein the data driver is to delay timings when gray scale data signals are respectively supplied to the at least two data lines based on a distance between the scan driver and each of the at least two data lines, and wherein the data driver is to delay the timings by different amounts.

In accordance with another embodiment, an apparatus includes a calculator to calculate a first delay correction value based on a voltage of a data signal line and a gray scale voltage to be output to the data signal line; and a controller to determine a timing when the gray scale voltage is to be output to the data signal line based on the first delay correction value, wherein the gray scale voltage corresponds to a gray scale value of light to be emitted from a pixel connected to the data signal line.

The calculator may calculate a second delay correction value based on a position of a scan line corresponding to the pixel, and the controller may determines the timing when the gray scale voltage is to be output to the data signal line based on the first and second delay correction values. The calculator may calculate the second delay correction value based on an RC time constant of the data signal line.

The apparatus may include a pre-charge control circuit to output a pre-charge voltage to the data signal line before the gray scale voltage is output, wherein the voltage on the data signal line may correspond to the pre-charge voltage.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
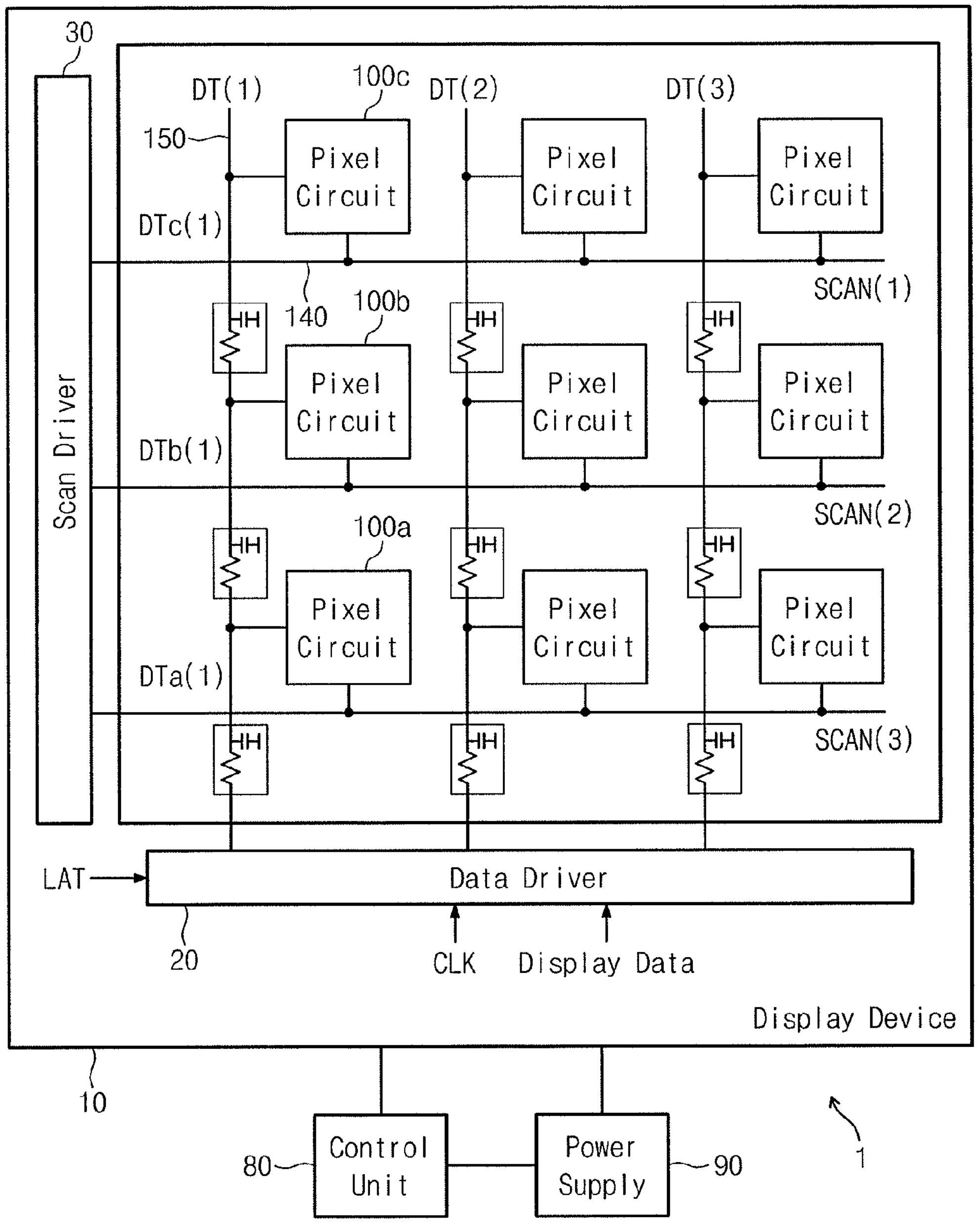
FIG. 1 illustrates an embodiment of an electronic.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. In the drawing figures, the dimensions of layers and regions may be exaggerated for clarity of illustration. Like reference numerals refer to like elements throughout.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

FIG. 1 illustrates an embodiment of an electronic device 1 for displaying an image. The electronic device 1 may be, for example, a smart phone, a handheld phone, a personal computer, a television, or another type of display or device which includes or is coupled to a display.

Referring to FIG. 1, the electronic device 1 includes a display device 10, a control unit 80, and a power supply unit 90. The display device 10 has pixel circuits 100 arranged in a matrix. The display device 10 may be, for example, an organic EL display that displays images by making a light-emitting diode emit light with a gray scale value corresponding to a written gray scale voltage. Alternatively, the display device 10 may be a device implemented with a liquid crystal display which displays an image with a gray scale corresponding to a written gray scale voltage.

The control unit 80 is a controller that controls an operation of the display device 10. The control unit 80 may include a central processing unit (CPU) and a memory. The control unit 80 controls driving of a data driver 20 and a scan driver 30. The control unit 80 receives gray scale data indicating a gray scale of each pixel on an image to be displayed on a display unit of the electronic device 1. The control unit 80 determines a gray scale voltage to be applied to each pixel, based on the input gray scale data. The control unit 80 controls the data driver 20 and the scan driver 30, such that a gray scale voltage corresponding to a gray scale is written at the pixel circuit 100 for light-emitting of a light-emitting diode EL of each pixel circuit 100.

The power supply unit 90 supplies power to each component of the electronic device 1, including the display device 10 and the control unit 80. An current is supplied from the power supply unit 90 for causing the light-emitting diode EL of each pixel circuit 100 to emit light. The power supply unit 90 applies an anode voltage ELVDD and a cathode voltage ELVSS.

The display device 10 contains the pixel circuit 100, the data driver 20, and the scan driver 30. The pixels of the display device include pixel circuits 100. The pixel circuits 100 are disposed at respective intersections of a plurality of scan lines 140 and a plurality of data lines 150. A plurality of pixels may be disposed at the display device 10, for example, in an n-by-m matrix. For illustrative purposes only, FIG. 1 shows nine pixels in a 3-by-3 matrix.

In FIG. 1, the resistance of the data signal lines 150 is modeled with capacitors C and resistors R. First, second, and third pixel circuits 100*a*, 100*b*, and 100*c* are sequentially disposed starting from the data driver 20, and they may be referred to as a pixel circuit 100 if distinction is not required.

The data driver 20 receives signals including, but not limited to, a latch signal LAT, a clock signal CLK, and display data according to control of the control unit 80. The data driver 20 supplies a data signal DT for writing a gray scale voltage at each pixel circuit 100 to the data signal line 150 corresponding to pixel circuits 100 in each column. The display data is data that the control unit 80 generates according to gray scale data and indicates a gray scale voltage of each pixel. A data signal DT(q) is a signal to be supplied to a q-th pixel (q being 1, 2, and 3). Here, symbols "DTa", "DTb", and "DTc" indicate data signals of portions where the data signal line 150 is connected with the first, second, and third pixel circuits 100*a*, 100*b*, and 100*c* (refer to FIG. 6).

As described above, due to influence of resistance of the data signal line 150, the data signal DT may be changed into data signals DTa, DTb, and DTc, which are delayed by the time constants determined by the resistors R and the capacitors C, according to distance from the data driver 20.

The scan driver 30 selects rows of the pixel circuits 100, at which gray scale voltages are to be written, sequentially and exclusively according to a scan signal SCAN supplied to the scan line 140 corresponding to the pixel circuit 100. A gray scale voltage of a data signal DT supplied to the data signal line 150 is written at the pixel circuits 100 in a selected row. A scan signal SCAN(n) is a signal to be supplied to an n-th row (n being 1, 2, and 3). A scan signal SCAN corresponding to a selected row of pixel circuits 100 has a low level. A scan signal SCAN corresponding to an unselected row of pixel circuits 100 has a high level.

Figure 2:
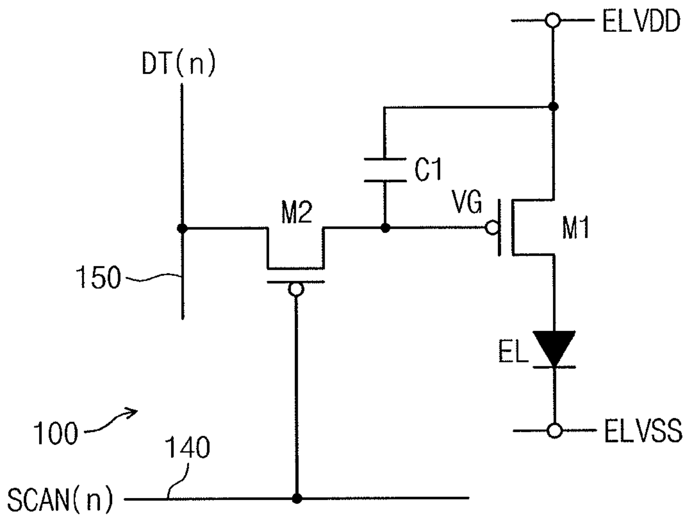
FIG. 2 illustrates an embodiment of a pixel circuit.

FIG. 2 illustrates an embodiment of a pixel circuit 100 which includes an organic light-emitting diode EL. A cathode of the light-emitting diode EL is connected to a power line of a cathode voltage ELVSS. The pixel circuit 100 also has two transistors M1 and M2 and a capacitive element C1. The transistors M1 and M2 may be, for example, p-type or n-type thin film transistors.

One of source or drain terminals of the transistor M1 is connected to an anode of the light-emitting diode EL. The other terminal is connected to a power line to which an anode voltage ELVDD is applied. The other terminal is connected to a gate terminal of the transistor M1 through the capacitive element C1. The gate terminal of the transistor M1 and a data signal line 150 are interconnected through the transistor M2. A gate terminal of the transistor M2 is connected to a scan line 140.

The transistor M2 is turned on when the scan line 140 is selected. The gate terminal of the transistor M1 is electrically connected to the data signal line 150 through the turned-on transistor M2, and a gray scale voltage is written. If the gray scale voltage is set with a gate voltage VG, current flows through the transistor M1 according to the gray scale voltage. The light-emitting diode EL emits light with a luminance corresponding to the amount of current flowing through the transistor M1. A gray scale expressed by each pixel may correspond to a gray scale voltage set with the gate voltage VG.

The pixel circuit 100 is but one type of pixel circuit that may be included in the display device 10. In other embodiments, the display device may have different types of pixel circuits 100. When the display device 10 is a liquid crystal display, the pixel circuit 100 may be implemented with a circuit that applies a written gray scale voltage at a liquid crystal element.

Figure 3:
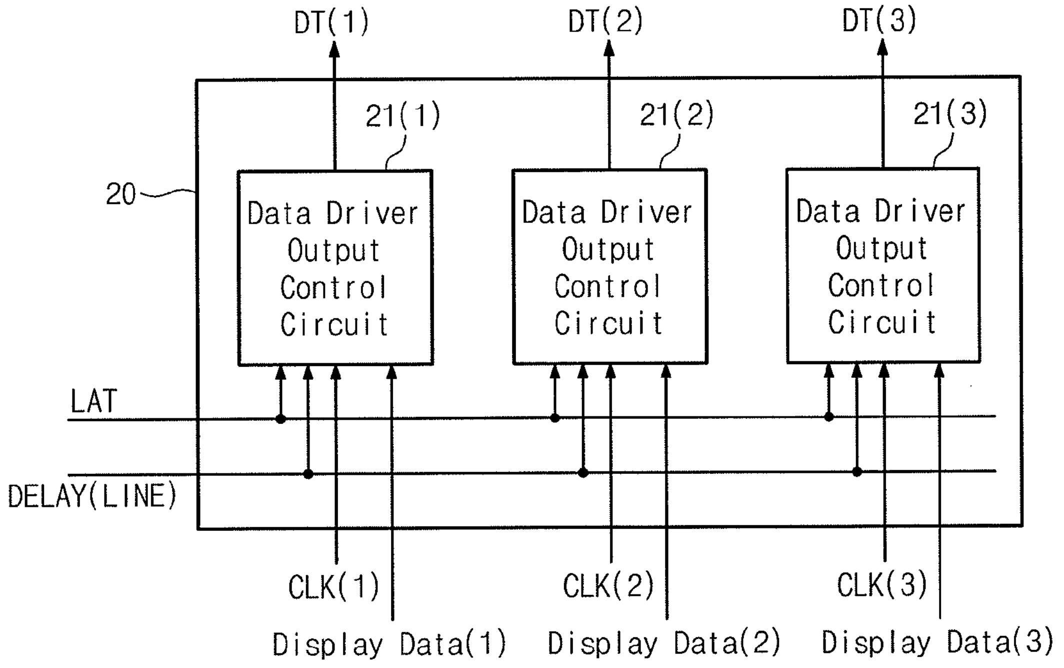
FIG. 3 illustrates an embodiment of a data driver.

FIG. 3 illustrates an embodiment of a data driver 20 which includes data driver output control circuits 21 that correspond to data signal lines 150. The numerals (1), (2), and (3) attached to symbols indicate association with a first column data signal line, a second column data signal line, and a third column data signal line.

Each data driver output control circuit 21 receives display data, indicating a gray scale voltage to be written at each pixel circuit 100, in synchronization with a clock signal CLK. The data driver output control circuit 21 adjusts timing when the gray scale voltage is output to the data signal line 150. A signal LAT is a signal that is used as a reference of timing when a gray scale voltage is output. The reference, for example, output timing of the gray scale voltage, may be set to a falling point in time of the signal LAT.

In one type of device, when the timing of outputting a gray scale voltage is to the data signal line 150 is not adjusted, gray scale expressivity is lowered due to delay of the data signal DT. However, in accordance with the present embodiment, the data driver output control circuit 21 adjusts output timing, to thereby suppress lowering of the gray scale expressivity due to the delay of the data signal DT.

A signal DELAY(LINE) that the data driver output control circuit 21 receives includes information associated with a position of a scan line 140 connected to a pixel circuit 100 at which a gray scale voltage is next to be written: information corresponding to a distance from a data driver 20 up to a pixel circuit 100 at which a gray scale voltage is to be written. In one embodiment, the signal DELAY(LINE) indicates information (delay correction value) corresponding to a delay time TS to be described later, and its value decreases as the pixel circuit 100 at which the gray scale voltage is to be written is farther away from the data driver 20.

Figure 4:
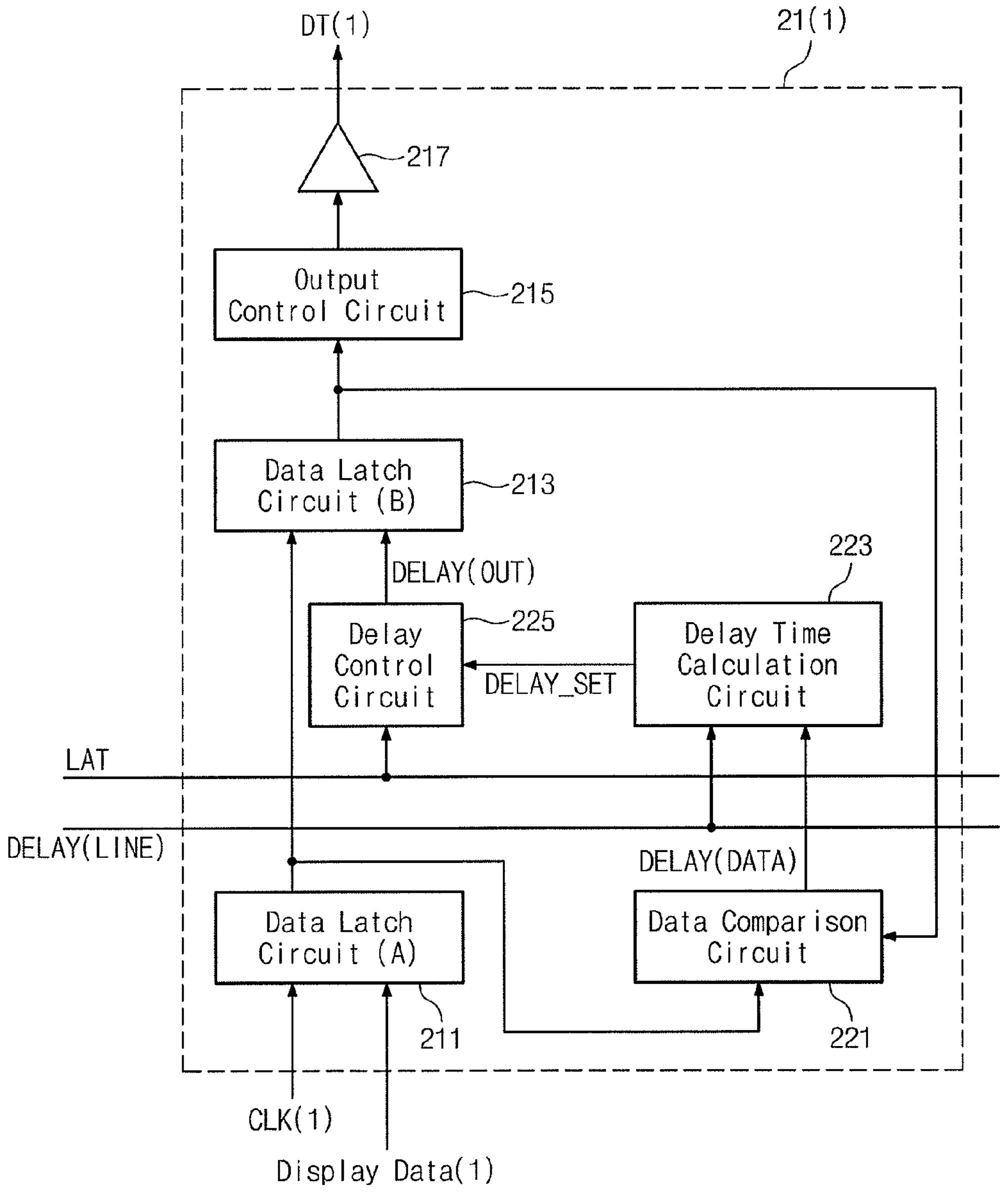
FIG. 4 illustrates an embodiment of a data driver output control circuit.

FIG. 4 illustrates an embodiment of a data driver output control circuit 21 which includes a data latch circuit (A) 211, a data latch circuit (B) 213, an output control circuit 215, an output buffer 217, a data comparison circuit 221, a delay time calculation circuit 223, and a delay control circuit 225.

The data latch circuit (A) 211 receives and latches display data (gray scale voltage) in synchronization with a clock signal CLK. The data latch circuit (B) 213 outputs a retained gray scale voltage to a data signal line 150 through the output control circuit 215 and the output buffer 217, based on a signal DELAY(OUT) corresponding to a delayed version of the signal LAT. A gray scale voltage from the data latch circuit (B) 213 is also provided to the data comparison circuit 221. The output control circuit 215 may be a digital-to-analog converter, for example.

The data latch circuit (B) 213 receives and latches a gray scale voltage latched by the data latch circuit (A) 211. With the above description, a gray scale voltage stored in the data latch circuit (B) 213 indicates a voltage to be output next to the data signal line 150. A gray scale voltage stored in the data latch circuit (A) 211 indicates a voltage to be output next to the data signal line 150.

The data comparison circuit 221 compares a gray scale voltage (e.g., a gray scale voltage currently maintained on the data signal line 150) from the data latch circuit (B) 213 and a gray scale voltage (i.e., a gray scale voltage stored in the data latch circuit (B) 213) to be output next to the data signal line 150. The data comparison circuit 221 outputs information (e.g., a signal DELAY(DATA)) on an absolute value of a difference between the gray scale voltages (hereinafter, referred to as a gray scale voltage difference). In one embodiment, the signal DELAY(DATA) includes information (delay correction value) corresponding to a delay time TS to be described later. Also, a value of the signal DELAY (DATA) decreases as the gray scale voltage difference becomes greater.

The delay time calculation circuit 223 calculates a time for delaying output of a gray scale voltage from the data latch circuit (B) 213 based on the signals DELAY(LINE) and DELAY(DATA). The delay time calculation circuit 223 provides the delay control circuit 225 with information (i.e., signal DELAY_SET) on the delay time. For example, a calculation result DELAY_SET is obtained by a product of signals DELAY(LINE) and DELAY(DATA).

A delay time of the signal DELAY_SET decreases as the pixel circuit 100 at which a gray scale voltage is to be written is farther away from the data driver 20 and as the gray scale voltage difference becomes greater. In contrast, the delay time of the signal DELAY_SET increases as the pixel circuit 100 at which a gray scale voltage is to be written becomes closer to the data driver 20 and as the gray scale voltage difference becomes smaller. Further, the signal DELAY_SET is calculated using the signals DELAY(LINE) and DELAY(DATA) such that the above-described relationship is satisfied. A variety of calculation methods may be used without restriction to production.

The delay control circuit 225 provides the data latch circuit (B) 213 with the signal DELAY(OUT) that is obtained by delaying the signal LAT based on the signal DELAY_SET. As described above, the data latch circuit (B) 213 outputs a gray scale voltage based on the signal DELAY (OUT). Thus, timing when a gray scale voltage is output to the data signal line 150 is adjusted so as to be delayed from the signal LAT as long as a time according to the signal DELAY_SET.

Figure 5:
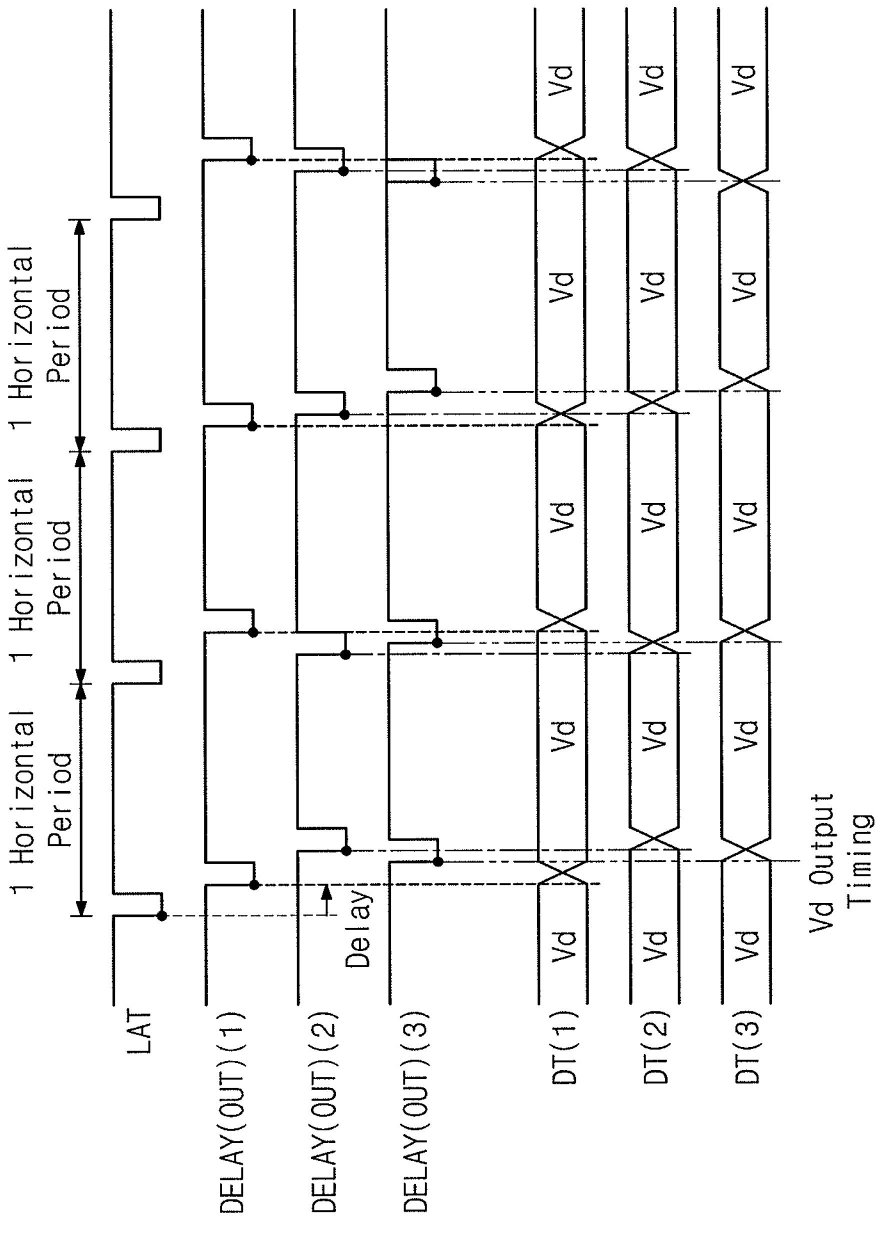
FIG. 5 illustrates an embodiment of a timing diagram.

FIG. 5 is one embodiment of a timing diagram in which a period between falling points in time when a signal LAT transitions to a low level is defined as 1 horizontal period. A signal DELAY(OUT)(q) corresponds to a q-th column (q=1, 2, and 3), and a DELAY(LINE) is constant in the same horizontal period regardless of columns. Thus, relative departure of timing of the signal DELAY(OUT) shown in FIG. 5 depends upon a difference (a gray scale voltage difference) between a first gray scale voltage and a second gray scale voltage: the first gray scale voltage being a voltage written at a pixel circuit 100 in a just previous horizontal period and the second gray scale voltage being a voltage written at the pixel circuit 100 in a current horizontal period.

Because a gray scale voltage Vd stored in a data latch circuit (B) 213 at a timing when the signal DELAY(OUT) goes to a low level is output to a data signal line 150, a data signal DT changes to a next gray scale voltage Vd from the timing. A possible effect that may be obtained by adjusting timing when the gray scale voltage Vd is output into the data signal line 150 is described below.

Figure 6:
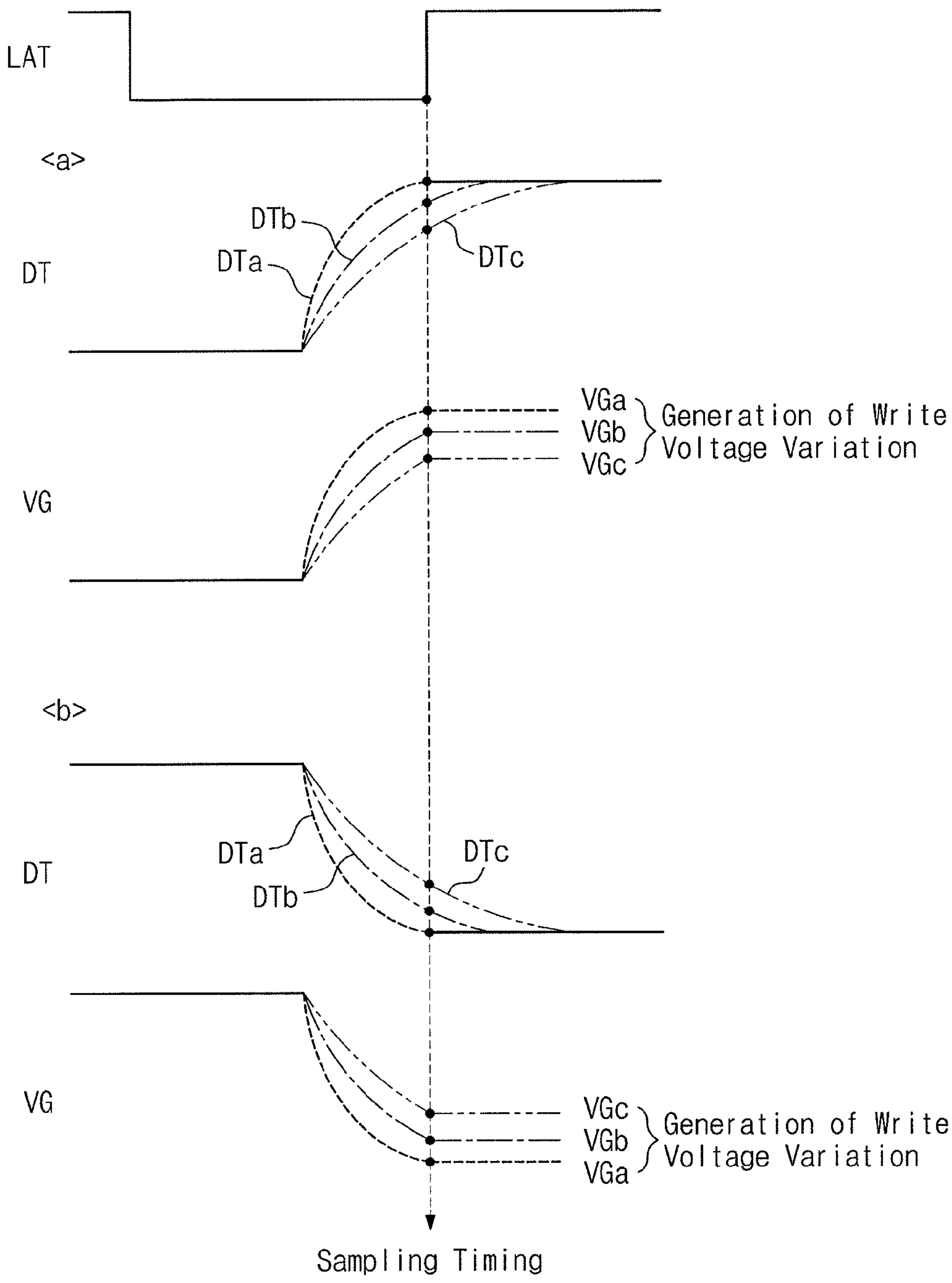
FIG. 6 (Related Art)
FIG. 6 illustrates a related-art example of the dependency of voltage variation on a column-direction panel position (e.g., when variation in gray scale is constant) during data writing.

FIG. 6 illustrates a related-art example of a dependency of voltage variation on column-direction panel position (e.g., when a variation in a gray scale is constant) during data writing. In FIG. 6, a <a> portion indicates a case where a gray scale voltage of a data signal DT and a gate voltage VG vary from a low voltage DT(Low Level) to a high voltage DT(High Level). A <b> portion indicates a case where the gray scale voltage of the data signal DT and the gate voltage VG vary from the high voltage DT(High Level) to the low voltage DT(Low Level). In FIG. 6, a variation in a gray scale voltage is the same.

As understood from comparison among data signals DTa, DTb, and DTc, the variation in gray scale voltage is delayed due to the resistance of a data signal line 150. The degree of delay varies with the time constant of each data signal line. A variation in a gray scale voltage of the data signal DTc applied to a third pixel circuit 100 far away from a data driver 20 is delayed compared with that of the data signal DTa applied to a first pixel circuit 100 close to the data driver 20. Variations of the data signals DTa, DTb, and DTc from a variation-starting point in time to a write timing of a pixel circuit 100 (sampling timing) are different from one another, thereby resulting in a variation in a gate voltage VG, that is, a gray scale voltage to be written at the pixel circuit 100. VGa, VGb, and VGc correspond to a first pixel circuit 100*a*, a second pixel circuit 100*b*, and a third pixel circuit 100*c*, respectively.

Thus, a gray scale value to be actually expressed and a gray scale voltage (e.g., ideal gray scale voltage) to be written change according to the position of a pixel (a column-direction panel position). As a result, the dependency on column-direction panel position increases more and more. The luminance becomes non-uniform due to an increase in this dependency, thereby resulting in a decrease in gray scale expressivity.

Figure 7:
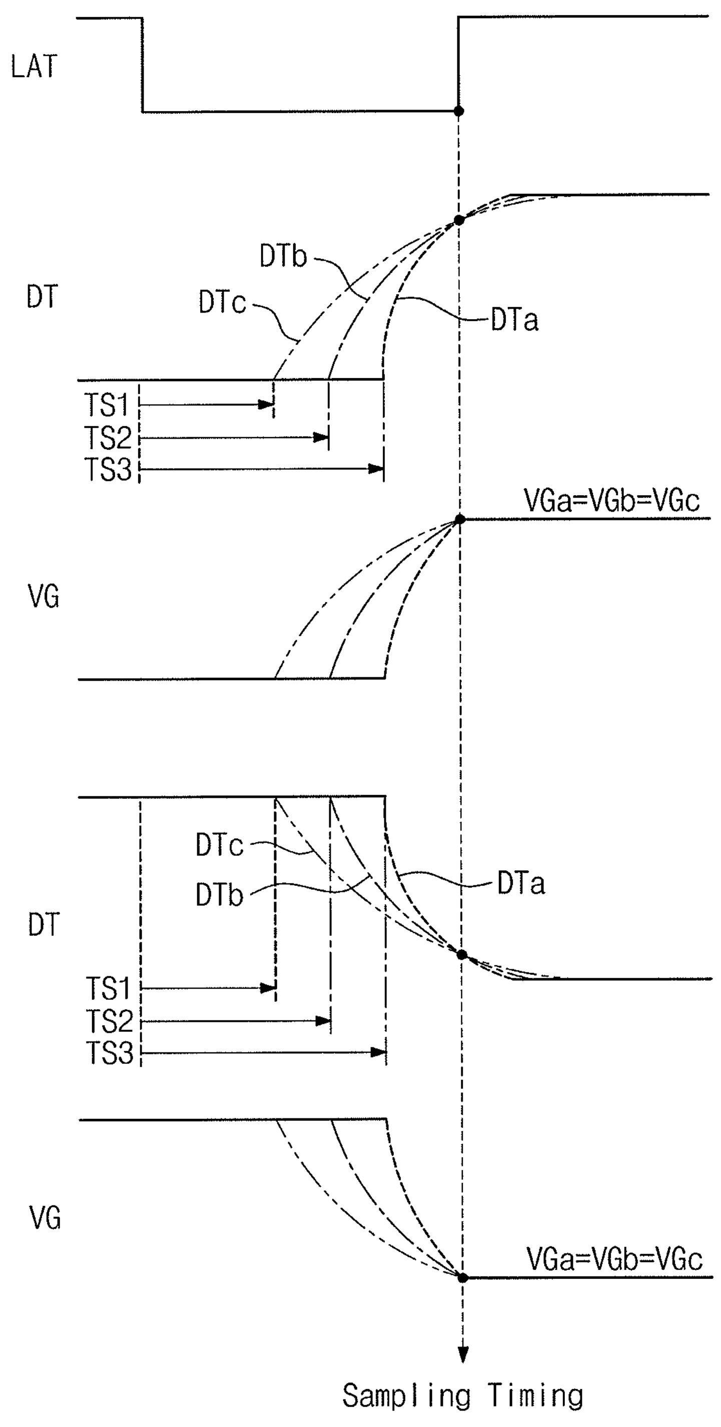
FIG. 7 illustrates an embodiment illustrating one type of dependency of voltage variation on a column-direction panel position (e.g. when variation in gray scale is constant) during data writing.

FIG. 7 illustrates an example of the dependency of voltage variation on a column-direction panel position (e.g., when a variation in a gray scale is constant) during data writing according to one embodiment. As illustrated in FIG. 7, a gray scale voltage of a data signal DTc begins to vary from a point in time delayed from a falling point in time of a signal LAT to a first time TS1. A gray scale voltage of a data signal DTb begins to vary from a point in time delayed from the falling point in time of the signal LAT to a second time TS2. A gray scale voltage of a data signal DTa begins to vary from a point in time delayed from the falling point in time of the signal LAT to a third time TS3. The variation in gray scale voltage, therefore, begins sooner as the delay of the data signal DT decreases.

If the starting timing of the gray scale voltage changes, the write timing on the pixel circuit may correspond to a point in time when the voltage levels of the data signals DTa, DTb, and DTc are almost equal to one another. Thus, the gray scale voltages to be written at the first to third pixel circuits 100*a* through 100*c* become almost equal to each other. That is, the gray scale value to be actually expressed and a gray scale voltage (e.g., ideal gray scale voltage) to be written does not change according to a position of a pixel (e.g., a column-direction panel position), or a difference between them is small. Thus, it is possible to prevent or lessen the degree of reduction in gray scale expressivity.

Figure 8:
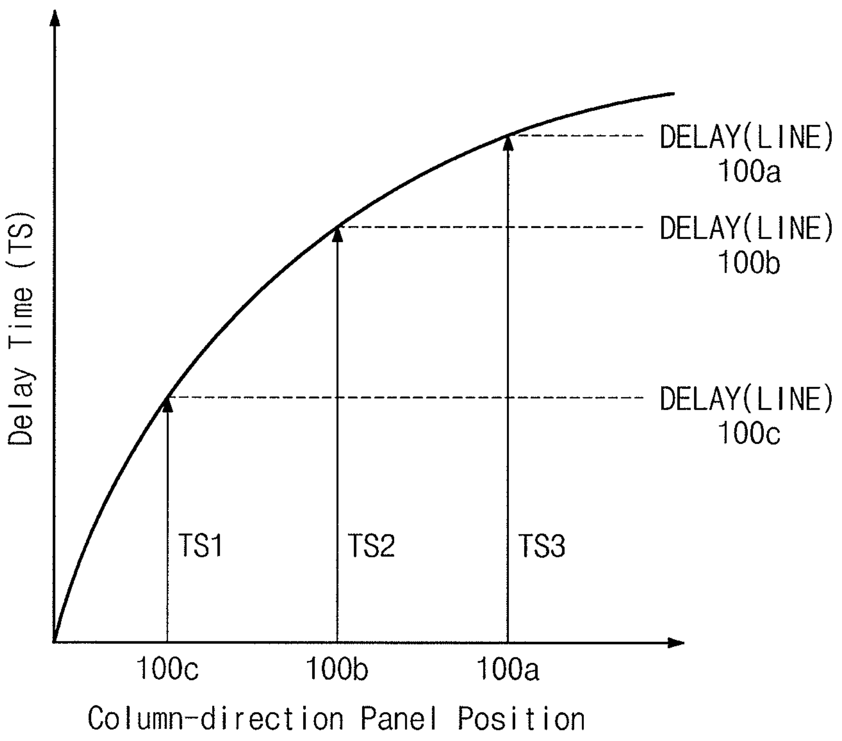
FIG. 8 illustrates an embodiment of a relationship between delay time and column-direction panel position.

FIG. 8 illustrates an example of a relationship between delay time TS and column-direction panel position. Referring to FIG. 8, the column-direction panel positions include positions corresponding to a first pixel circuit 100*a*, a second pixel circuit 100*b*, and a third pixel circuit 100*c*. A starting point (0) indicates a pixel circuit far away from a data driver 20.

As illustrated in FIG. 8, the delay time TS decreases as the pixel circuits get closer to the data signal line 150, because the time constant of resistance of a data signal line 150 decreases. Conversely, the delay time TS increases as the pixel circuits get farther away from the data signal line 150, because the time constant of resistance of the data signal line 150 increases. A signal DELAY(LINE) may be determined according to this relationship. For example, in one embodiment, the signal DELAY(LINE) is set by the first time TS1 with respect to the third pixel circuit 100*c*, by the second time TS2 with respect to the second pixel circuit 100*b*, and by the third time TS3 with respect to the first pixel circuit 100*a*.

Figure 9:
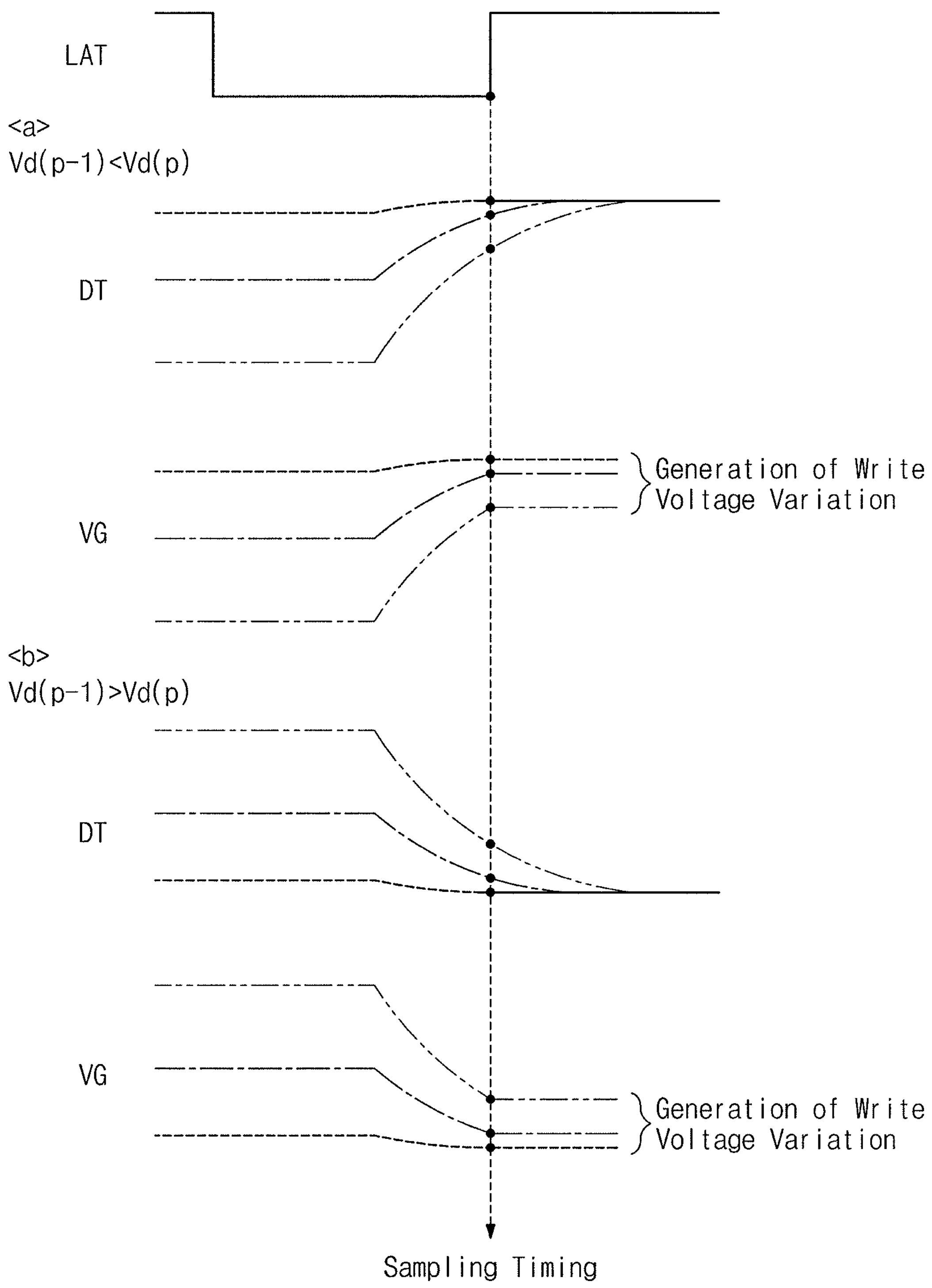
FIG. 9 (Related Art)
FIG. 9 illustrates a related-art example of the dependency of voltage variation on a gray scale voltage difference (e.g., when a column-direction panel position is constant) during data writing.

FIG. 9 illustrates a related-art example of a dependency of voltage variation on a gray scale voltage difference (e.g., when a column-direction panel position is constant) during data writing. In FIG. 9, the <a> portion indicates a case where a gray scale voltage of a data signal DT and a gate voltage VG vary from a low voltage Vd(p−1) to a high voltage Vd(p). The <b> portion indicates a case where the gray scale voltage of the data signal DT and the gate voltage VG vary from the high voltage Vd(p) to the low voltage Vd(p−1), i.e., the voltage Vd(p−1) is greater than the voltage Vd(p). In each case, three steps are illustrated where variations are different.

The symbol "p" indicates a row of pixel circuits 100 arranged in a matrix. A gray scale voltage Vd(p−1) corresponds a gray scale voltage output to a data signal line 150 when a previous row of a gray scale voltage Vd(p) is selected; that is, a gray scale voltage on the data signal line 150 before the gray scale voltage Vd(p) is output. The pixel circuits at which gray scale voltages are to be written may be located at the same row.

As understood from a comparison among data signals DT, variation in gray scale voltages are different due to a gray scale voltage difference between Vd(p−1) and Vd(p). A great variation is required as a gray scale voltage difference becomes greater. Nevertheless, if the time from a variation-starting point in time to a write timing (sampling timing) on a pixel circuit is constant, the actual gray scale voltage to be written at the pixel circuit (e.g., gate voltage VG) deviates from a target gray scale voltage when a gray scale voltage difference is great.

Thus, in this related-art example, because the gray scale value to be actually expressed and the gray scale voltage (target gray scale voltage) to be written change according to the gray scale voltage difference, image quality deteriorates as a result of crosstalk depending on a previously written gray scale voltage. This causes a decrease in gray scale expressivity.

Figure 10:
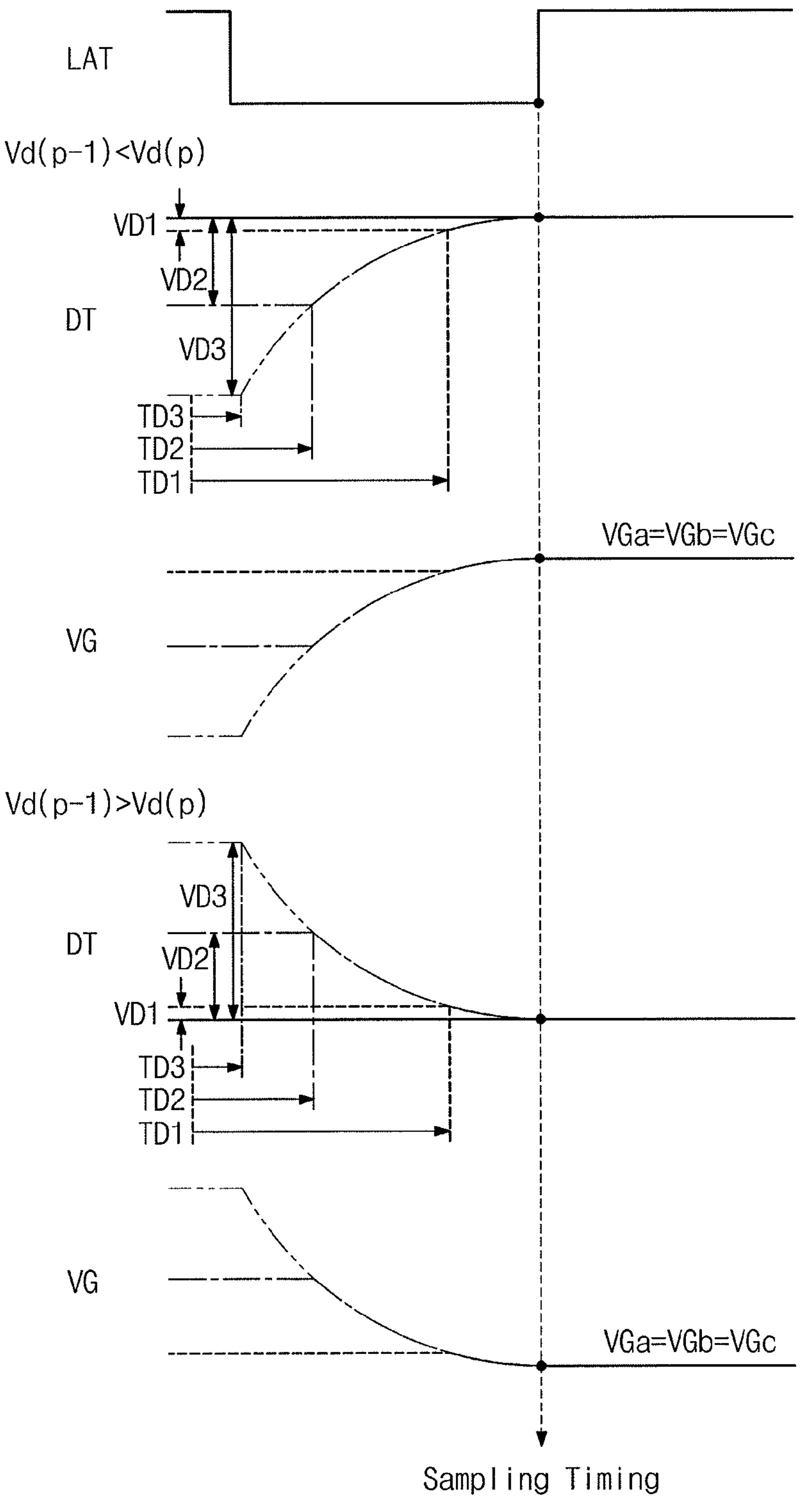
FIG. 10 illustrates an embodiment illustrating one type of dependency of voltage variation on a gray scale voltage difference (e.g., when a column-direction panel position is constant) during data writing.

FIG. 10 illustrates an embodiment illustrating the dependency of voltage variation on a gray scale voltage difference (e.g., when a column-direction panel position is constant) during data writing.

As illustrated in FIG. 10, the gray scale voltage of a data signal DT, having a gray scale voltage difference VD1 with a target gray scale voltage Vd(p), begins to vary from a point in time delayed from a falling point in time of a signal LAT to a first time TS1. A gray scale voltage of a data signal DT, having a gray scale voltage difference VD2 with the target gray scale voltage Vd(p), begins to vary from a point in time delayed from the falling point in time of the signal LAT to a second time TS2. A gray scale voltage of a data signal DT, having a gray scale voltage difference VD3 with the target gray scale voltage Vd(p), begins to vary from a point in time delayed from the falling point in time of the signal LAT to a second time TS3. A gray scale voltage rapidly reaches the target gray scale voltage Vd(p) as the gray scale voltage differences VD1, VD2, and VD3 become smaller. Thus, the timing when a gray scale voltage begins to change is delayed by making the delay time long.

Because the timing when a gray scale voltage begins to change is adjusted, the data signal DT has almost the same voltage level at a write timing (e.g., sampling timing) on the pixel circuit regardless of the gray scale voltage difference. This enables gray scale voltages to be written at the pixel circuits (e.g., gate voltages VGa, VGb, and VGc) to become equal to each other, thereby making it possible to restrain or lessen the degree of reduction in gray scale expressivity.

Figure 11:
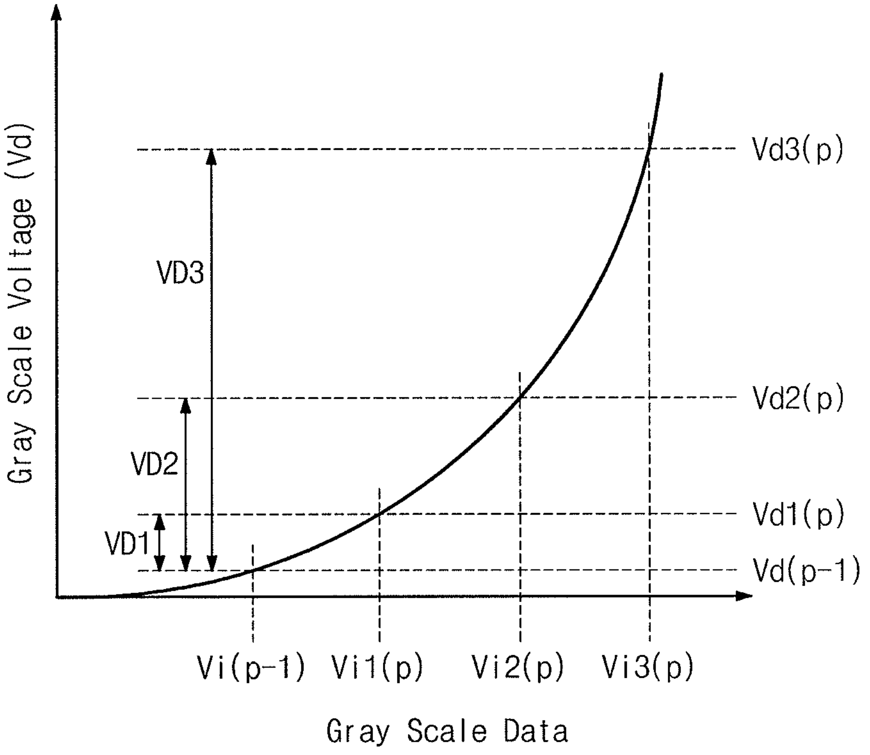
FIG. 11 illustrates a gray scale voltage difference according to an embodiment.

FIG. 11 illustrates a gray scale voltage difference according to one embodiment. In FIG. 11, gray scale data Vi to be provided to the display device 10 may change to a gray scale voltage Vd based on a γ curve in FIG. 11. In one embodiment, referred to as a gray scale voltage difference is a difference between gray scale voltages Vd that are obtained from a gray scale difference on gray scale data Vi according to the γ curve.

Figure 12:
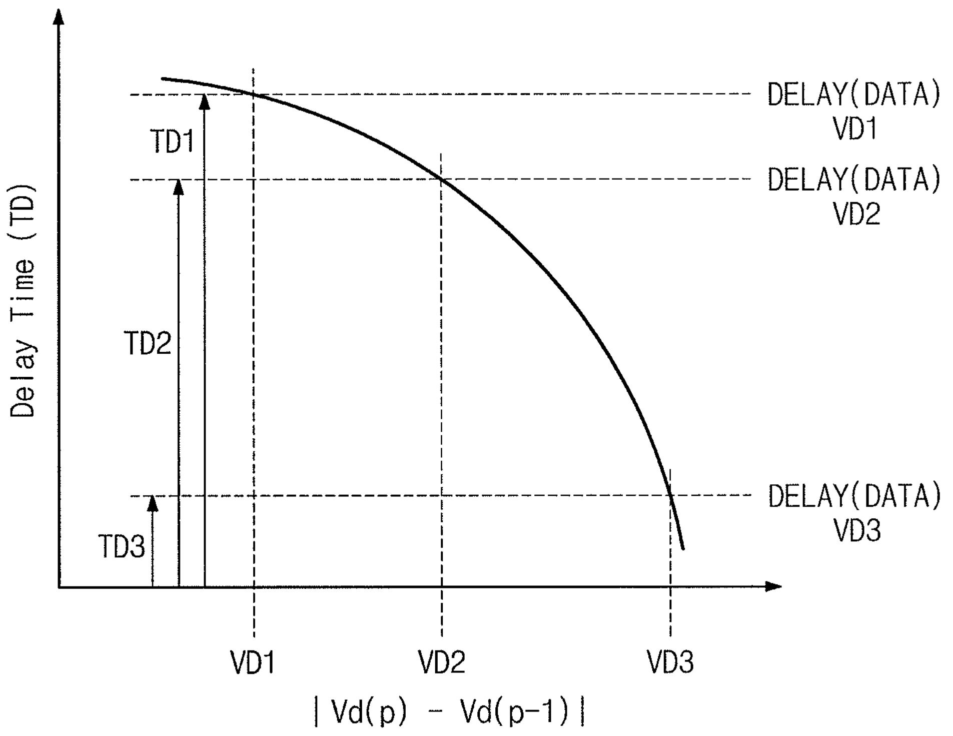
FIG. 12 illustrates an embodiment illustrating a relationship between delay time and gray scale voltage difference.

FIG. 12 illustrates a relationship between a delay time TD and a gray scale voltage difference according to one embodiment. As illustrated in FIG. 12, a gray scale voltage quickly reaches a target gray scale voltage Vd(p) as the gray scale voltage difference (|Vd(p)−Vd(p−1)|) decreases. The signal DELAY(DATA) is determined according to this relationship. In one embodiment, the signal DELAY(DATA) is set by a first time TS1 with respect to a gray scale voltage difference VD1, by a second time TS2 with respect to a gray scale voltage difference VD2, and by a third time TS3 with respect to a gray scale voltage difference VD3.

Figure 13:
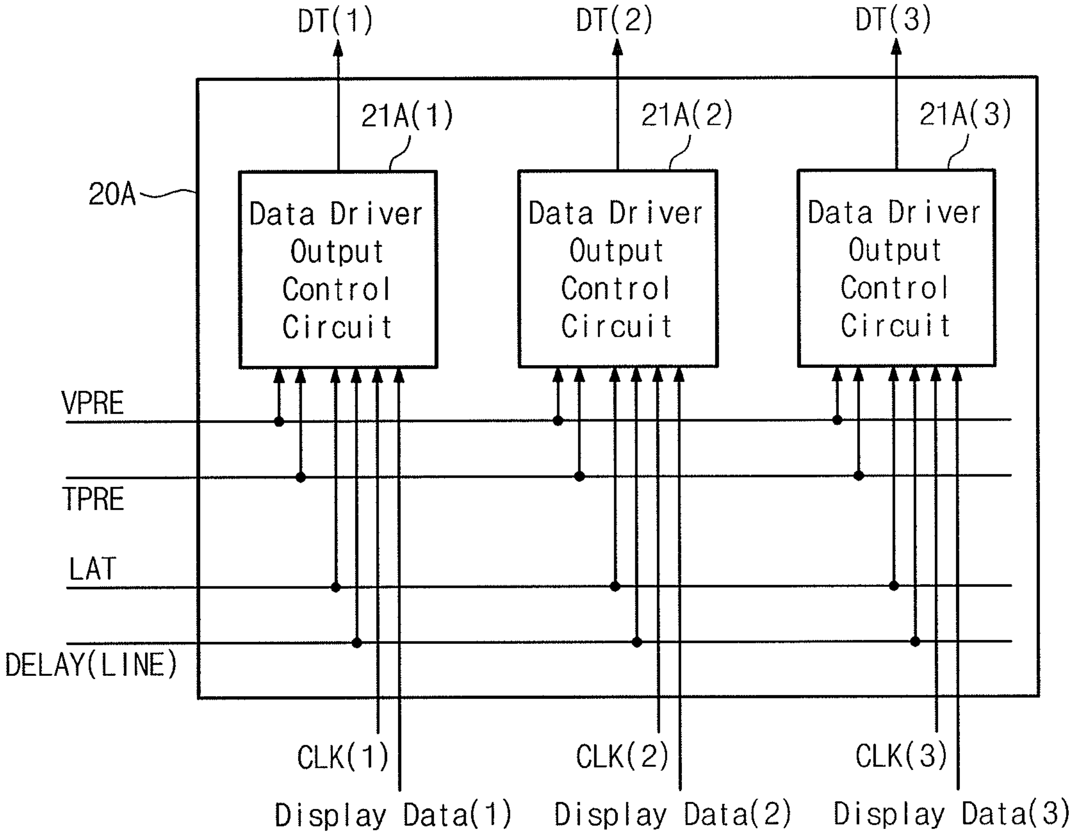
FIG. 13 illustrates another embodiment of a data driver.

FIG. 13 illustrates a second embodiment of a data driver 20A which includes data driver output control circuits 21A that correspond to data signal lines 150 at respective columns. The second embodiment corresponds to the case where a pre-charge voltage is applied during a variation when a horizontal period shifts and a gray scale voltage changes.

Figure 14:
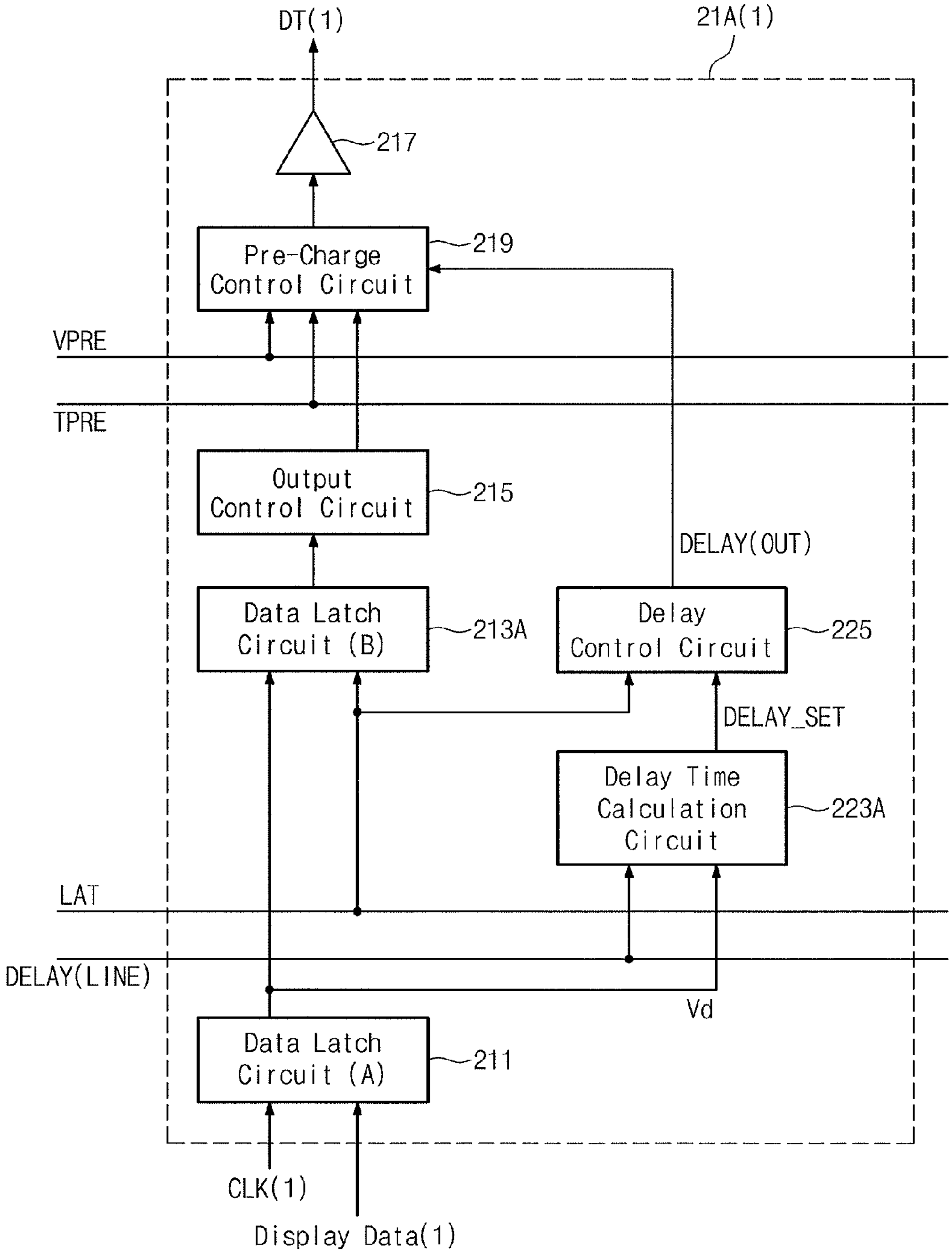
FIG. 14 illustrates another embodiment of a data driver output control circuit.

Referring to FIG. 14, the data driver output control circuit 21A receives not only signals provided to a data driver output control circuit 21 according to the first embodiment previously discussed, but also receives a pre-charge voltage VPRE and a pre-charge timing signal TPRE. The pre-charge voltage VPRE may be set with a center value of a gray scale voltage range or with another predetermined constant voltage. The pre-charge timing signal TPRE is a signal for defining timing when the pre-charge voltage VPRE is output to the data signal line 150.

FIG. 14 illustrates a second embodiment of the data driver output control circuit 21A which includes a data latch circuit (A) 211, a data latch circuit (B) 213A, an output control circuit 215, an output buffer 217, a pre-charge control circuit 219, a delay time calculation circuit 223A, and a delay control circuit 225.

The data latch circuit (B) 213A outputs a retained gray scale voltage to a data signal line 150 through the output control circuit 215, the pre-charge control circuit 219, and the output buffer 217, based on a signal LAT. The gray scale voltage from the output control circuit 215 may be retained in the pre-charge control circuit 219.

In response to a low level of the pre-charge timing signal TPRE, the pre-charge control circuit 219 outputs the pre-charge voltage VPRE to a data signal line 150 through the output buffer 217. A section where the pre-charge timing signal TPRE has a low level is included in a section of 1 horizontal period (e.g., an interval between falling points of time of the signal LAT) where a signal SCAN has a low level.

The pre-charge control circuit 219 also retains, as described above, a gray scale voltage from the output control circuit 215. The pre-charge control circuit 219 outputs the retained gray scale voltage to the data signal line 150 through the output buffer, based on a signal DELAY(OUT) corresponding to a delayed version of the signal LAT.

The delay time calculation circuit 223A calculates a time for delaying the gray scale voltage that the pre-charge control circuit 219 will output, based on the signal DELAY (LINE) and a signal DELAY(DATA) determined from a gray scale voltage Vd. The delay time calculation circuit 223A outputs information (e.g., signal DELAY_SET) corresponding to the delay time thus calculated to the delay control circuit 225. The gray scale voltage Vd indicates a gray scale voltage next to be output to the data signal line 150 (e.g., a gray scale voltage the pre-charge control circuit 219 retains).

The delay time calculation circuit 223A calculates a difference between an input gray scale voltage Vd (e.g., gray scale voltage retained in the pre-charge control circuit 219) and a predetermined pre-charge voltage VPRE as a gray scale voltage difference. The delay time calculation circuit 223A converts the gray scale voltage difference to the signal DELAY(DATA). The relationship where the signal DELAY (DATA) has a small value as the gray scale voltage difference increases may be the same as described with reference to a first embodiment. Calculation on the signal DELAY_SET may also be the same as described with reference to the first embodiment. Because the gray scale voltage difference is determined with respect to the pre-charge voltage VPRE, a data comparison circuit 221 as described with reference to the first embodiment may be omitted.

The delay control circuit 225 provides the pre-charge control circuit 219 with the signal DELAY(OUT) obtained by delaying the signal LAT according to the signal DELAY_SET. As described above, the pre-charge control circuit 219 outputs a gray scale voltage in response to the signal DELAY(OUT). Like the first embodiment, the timing when a gray scale voltage is output to the data signal line 150 may be adjusted to be delayed from the signal LAT to a time according to the signal DELAY_SET. Before the gray scale voltage is output to the data signal line 150, the pre-charge control circuit 219 outputs the pre-charge signal VPRE in advance in response to the pre-charge timing signal TPRE.

Figure 15:
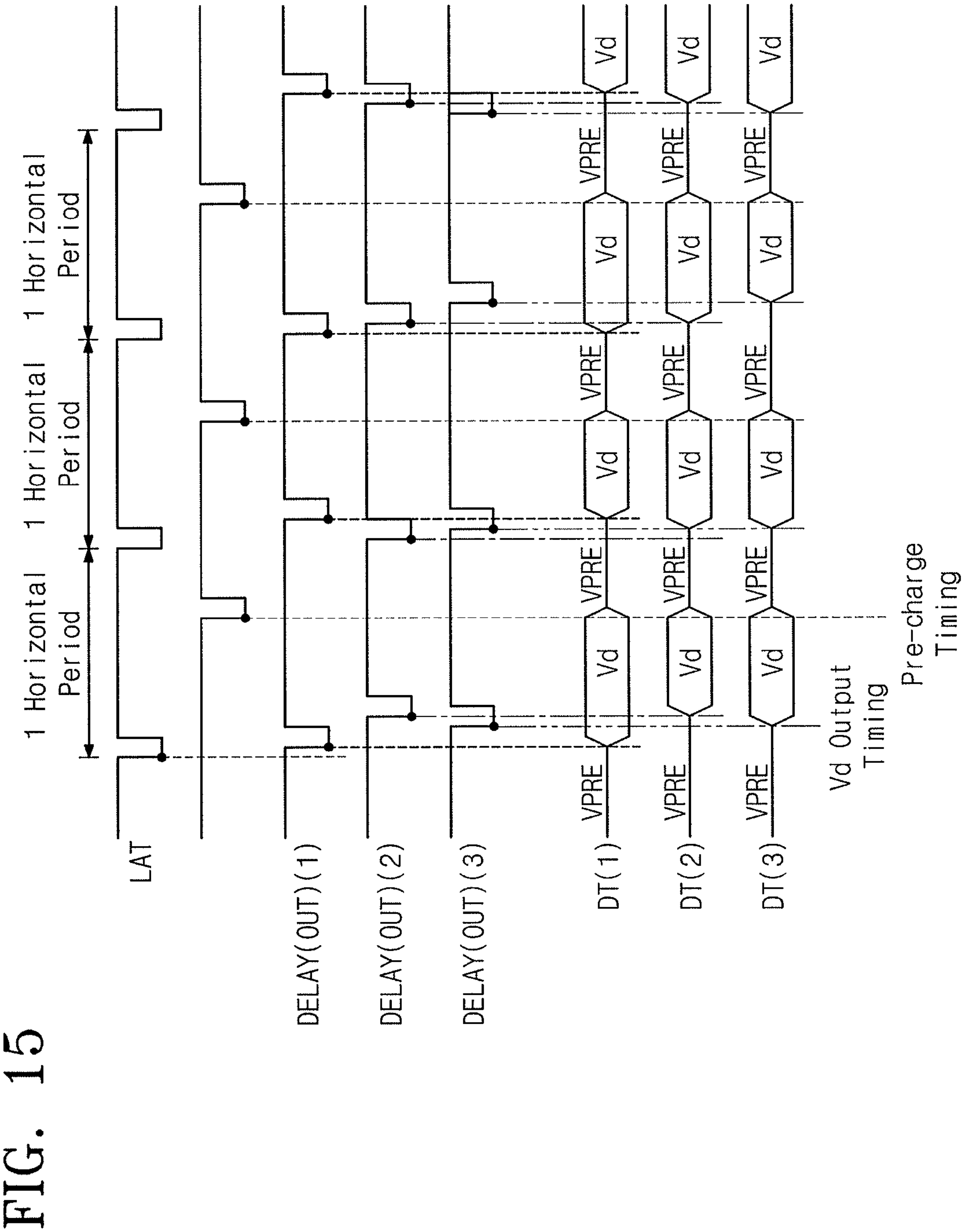
FIG. 15 illustrates another embodiment of a timing diagram.

FIG. 15 illustrates a second embodiment of a timing diagram. Referring to FIG. 15, the pre-charge control circuit 219 outputs a pre-charge voltage VPRE to the data signal line 150 in response to a low level of a pre-charge timing signal TPRE. Thus, the data signal DT is converted to a pre-charge voltage VPRE. Because the gray scale voltage Vd retained in the pre-charge control circuit 219 is output to the data signal line 150 at a timing when the signal DELAY (OUT) goes to a low level, the pre-charge voltage VPRE of the data signal DT is converted to a next gray scale voltage Vd from the timing.

Figure 16:
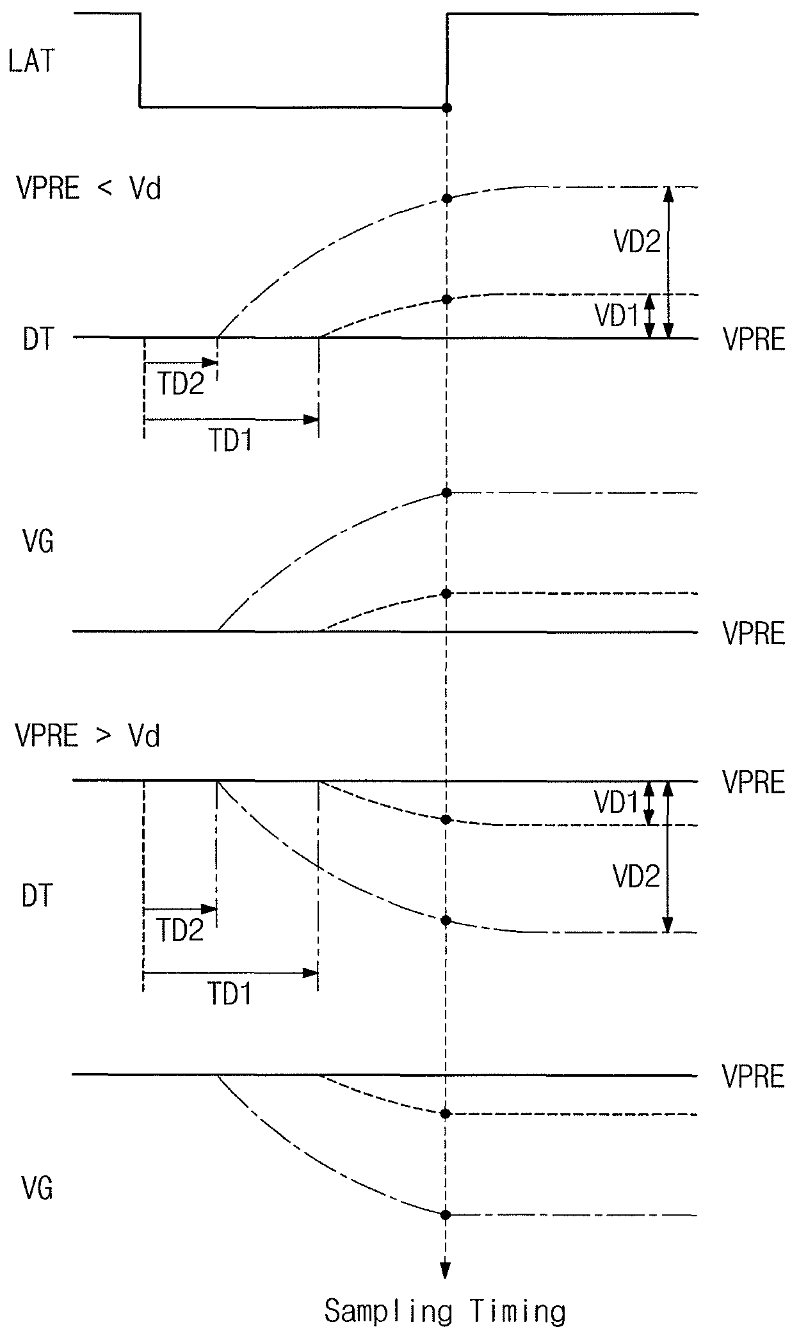
FIG. 16 illustrates another embodiment illustrating one type of dependency of voltage variation on a gray scale voltage difference (e.g., when a column-direction panel position is constant) during data writing.

FIG. 16 illustrates a dependency of voltage variation on a gray scale voltage difference (e.g., when a column-direction panel position is constant) during data writing according to a second embodiment. The dependency on a column-direction panel position may be the same as the first embodiment.

In FIG. 16, the <a> portion indicates a case where a gray scale voltage of a data signal DT and a gate voltage VG vary from a pre-charge voltage VPRE to a high gray scale voltage Vd (VPRE<Vd). The <b> portion indicates a case where the gray scale voltage of the data signal DT and the gate voltage VG vary from the pre-charge voltage VPRE to a low gray scale voltage Vd (VPRE>Vd). In FIG. 16, two steps are exemplified where variations are different.

As illustrated in FIG. 16, the variation in gray scale voltage begins at a point in time delayed from a falling point in time of a signal LAT to a first time TD1, with respect to a gray scale voltage difference VD1. Likewise, the variation in gray scale voltage begins at a point in time delayed from the falling point in time of the signal LAT to a second time TD2, with respect to a gray scale voltage difference VD2. Referring to each data signal DT, a gray scale voltage quickly reaches a target gray scale voltage Vd as a gray scale voltage difference decreases. Thus, the timing when a gray scale voltage begins to change is delayed by increasing the delay time.

In one related-art example, when output timing of a gray scale voltage is not adjusted, the ratio of an actually written gray scale voltage (gate voltage VG) to a gray scale voltage to be originally written changes due to the gray scale voltage to be written (e.g., a gray scale voltage difference on the pre-charge voltage).

In contrast, in the second embodiment, because the timing when gray scale voltage begins to change is adjusted, data signals DT have a level equal to a gray scale voltage to be written (e.g., ideal gray scale voltage) at a sampling timing regardless of a gray scale voltage to be written. Thus, it is possible to restrain a ratio of an actually written gray scale voltage (e.g., gate voltage VG) to a gray scale voltage to be originally written from changing due to the gray scale voltage to be written (e.g., a gray scale voltage difference on the pre-charge voltage).

Figure 17:
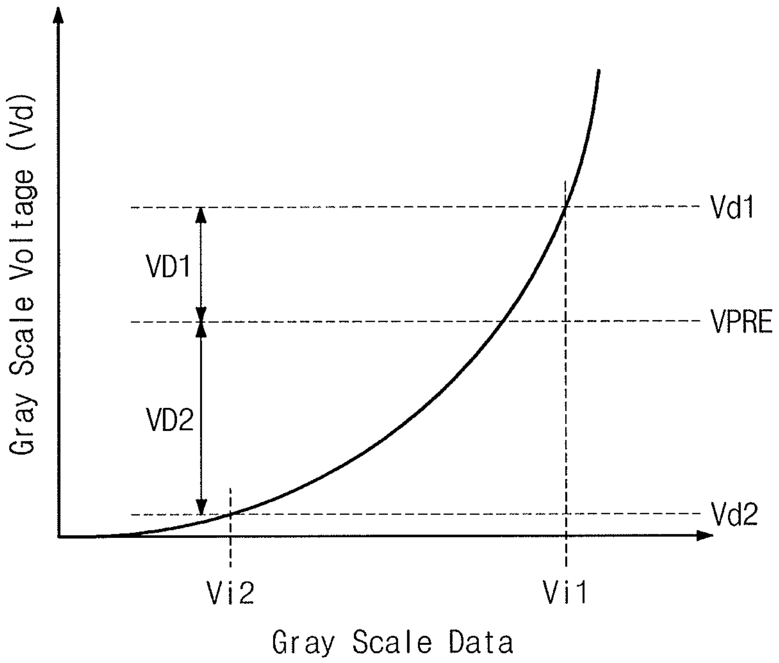
FIG. 17 illustrates a gray scale voltage difference according to another embodiment.

FIG. 17 illustrates a gray scale voltage difference according to a second embodiment. Referring to FIG. 17, gray scale data Vi to be provided to a display device 10 may change into a gray scale voltage Vd, based on a $\gamma$ curve in FIG. 17. In one embodiment, a gray scale voltage difference may correspond to a difference between a pre-charge voltage VPRE and a gray scale voltage Vd calculated from gray scale data according to the $\gamma$ curve.

Figure 18:
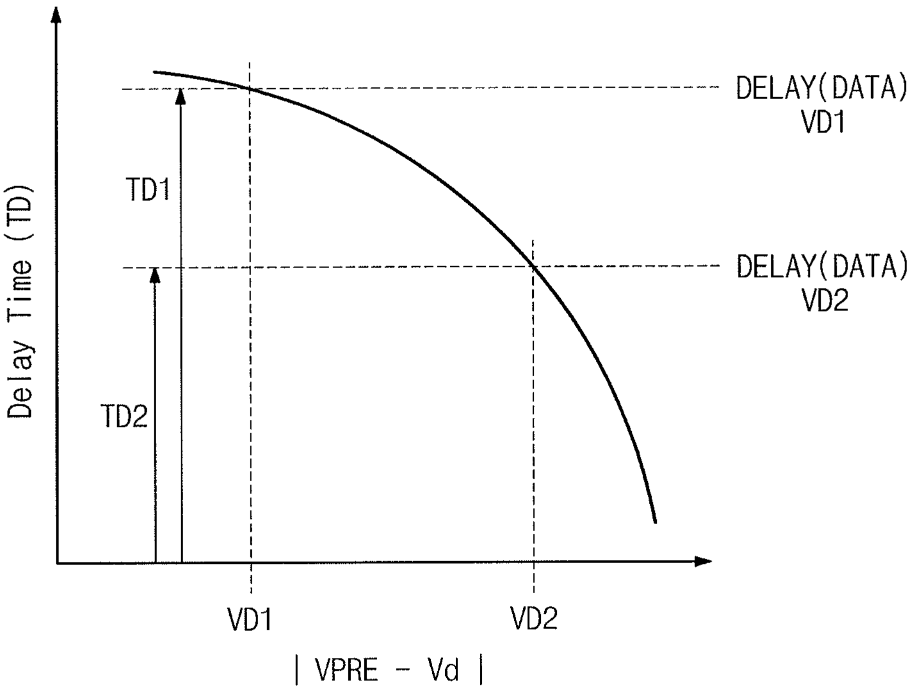
FIG. 18 illustrates another embodiment illustrating a relationship between delay time and gray scale voltage difference.

FIG. 18 illustrates a relationship between delay time TD and gray scale voltage difference according to a second embodiment. As illustrated in FIG. 18, a gray scale voltage quickly reaches a target gray scale voltage Vd(p) as a gray scale voltage difference (|VPRE−Vd|) decreases. Thus, the relationship that a delay time TD increases as the gray scale voltage difference (|VPRE−Vd|) decreases exists. A signal DELAY(DATA) is determined according to this relationship. The signal DELAY(DATA) may be set by a first time TD1 with respect to a gray scale voltage difference VD1 and by a second time TD2 with respect to a gray scale voltage difference VD2.

In the second embodiment, as understood from FIG. 17, the gray scale voltage difference VD is based on a pre-charge voltage VPRE. When the pre-charge voltage VPRE is a predetermined (e.g., center) value of a gray scale voltage Vd, a maximum value of a gray scale voltage difference (VD=|VPRE−Vd|) is half the maximum value (e.g., a difference between maximum and minimum values of the gray scale voltage Vd) of a gray scale voltage difference VD according to a first embodiment. Also, in the second embodiment, the variation in gray scale voltage decreases compared with the first embodiment, thereby making it possible to reduce a maximum value of delay time TD.

Figure 19:
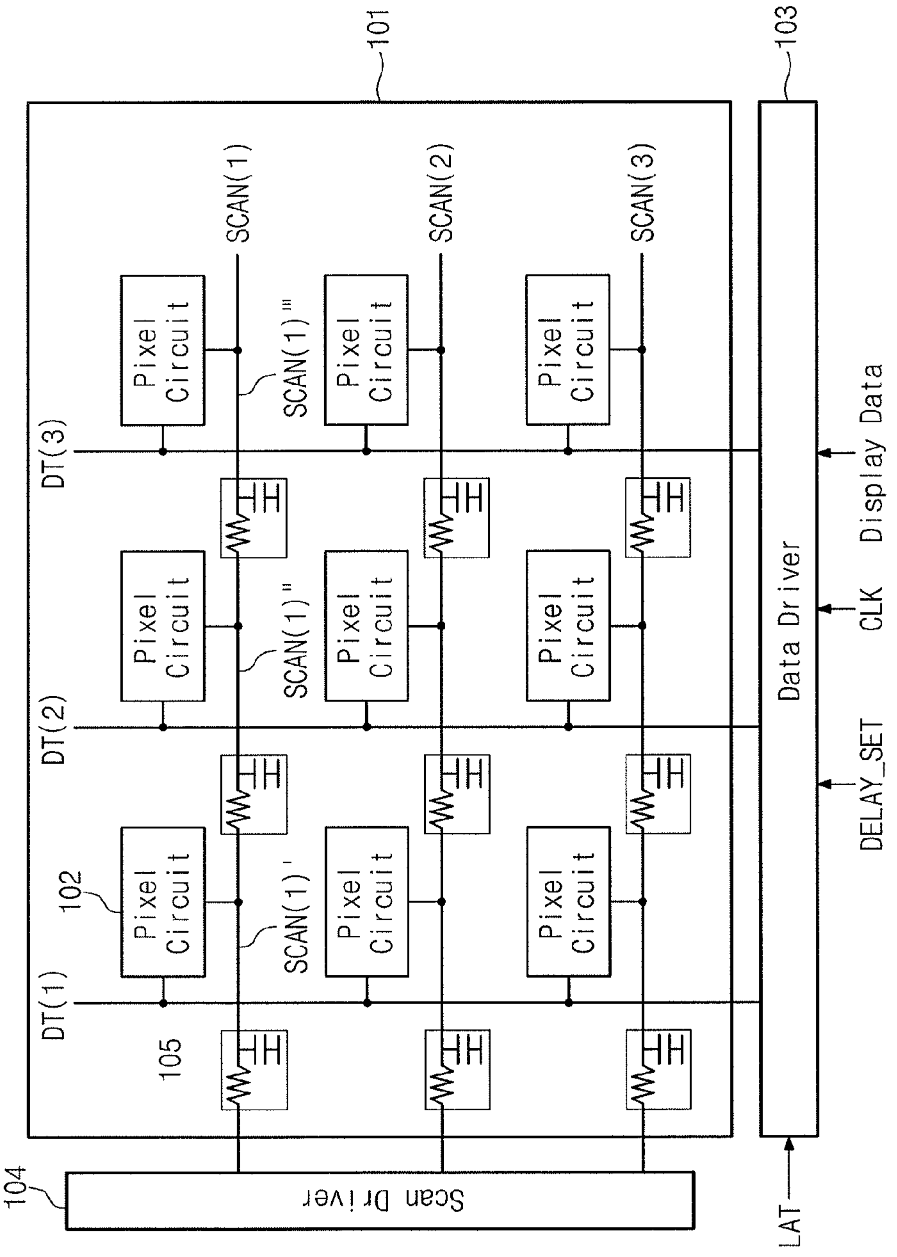
FIG. 19 illustrates another embodiment of a display device.

FIG. 19 illustrates a third embodiment of a display device which includes a panel 101, a data driver 103, and a scan driver 104. A plurality of scan lines SCAN(1), SCAN(2), and SCAN(3) are connected to the scan driver 104 and are disposed on the panel 101. A plurality of data lines DT(1), DT(2), and DT(3) are connected to the data driver 103 and are also disposed on the panel 101. The scan lines SCAN(1), SCAN(2), and SCAN(3) and the data lines DT(1), DT(2), and DT(3) intersect. The number of scan lines may correspond to a predetermined number. Also, the number of data lines correspond to a predetermined number which is at least two.

Pixel circuits 102 are arranged on the panel 101 to correspond to intersections of the scan lines SCAN(1), SCAN(2), and SCAN(3) and the data lines DT(1), DT(2), and DT(3). Each pixel circuit 102 is selected by a scan line and receives a gray scale data signal from a corresponding data signal line to perform a display operation. The pixel circuits may be, for example, liquid crystal display pixels or an organic EL pixels.

Figure 20:
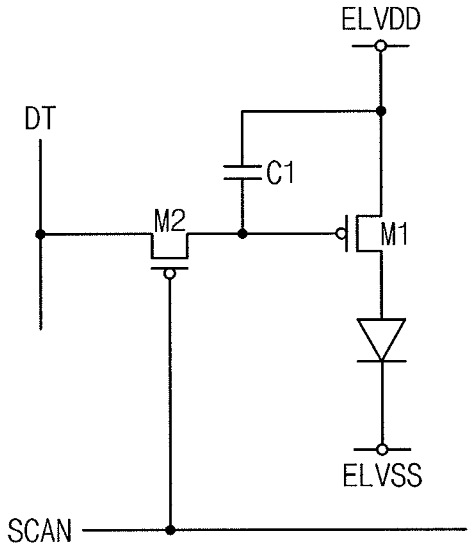
FIG. 20 illustrates another embodiment of a pixel circuit.

FIG. 20 shows an embodiment of a pixel circuit including an organic EL element. Referring to FIG. 20, in this illustrative embodiment, transistors M1 and M2 are p-type transistors. A transistor M2 has a gate electrode connected to one SCAN of a plurality of scan lines, a source or drain electrode connected to a data signal line DT, and the other of the source or drain electrode connected to one electrode of a capacitor C1 and a gate electrode of the transistor M1. One of the source or drain electrodes of the transistor M1 is connected to a power terminal ELVDD and the other electrode of the capacitor C1. The other of the source or drain electrodes is connected to an anode electrode of an organic EL element. A cathode electrode of the organic EL element is connected to a power terminal ELVSS.

Figure 21:
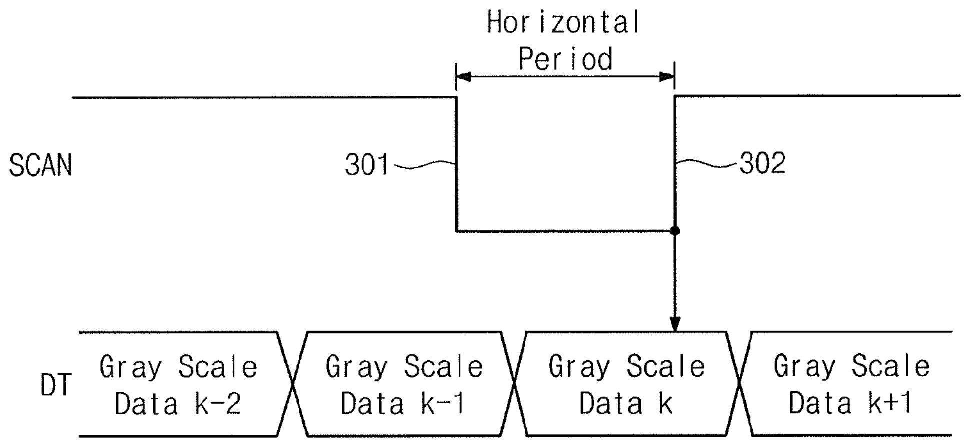
FIG. 21 illustrates an embodiment of a method for operating the pixel circuit in FIG. 20.

FIG. 21 illustrates operation of the pixel circuit in FIG. 20 according to one embodiment. Gray scale data signals (k−2), (k−1), k, and (k+1) are supplied to a data signal line DT with the lapse of time. For a pixel circuit connected to a scan line SCAN to receive the gray scale data signal k, a scan signal being supplied to the scan line SCAN transitions from a high level to a low level (refer to a reference numeral 301). After 1 horizontal period elapses, the scan line signal rises from a low level to a high level when the gray scale data signal k is supplied to the data signal line DT (refer to a reference numeral 302).

The transistor M2 is turned off during a high level of the scan line signal, and is turned on during a low level of the scan line signal to supply a gray scale data signal from the data signal line DT to one electrode of the capacitor C1. Afterwards, when the transistor M2 is turned off in response to a high level of the scan line signal, charge corresponding to the gray scale data signal is accumulated in the capacitor C1. A potential corresponding to the charge accumulated in the capacitor C1 is applied between a gate terminal and a source or drain terminal of the transistor M1, and current in an amount determined according to the potential is supplied to an organic light-emitting diode.

FIG. 21 illustrates an embodiment in which the scan line signal has a pulse shape (refer to reference numerals 301 and 302) and varies such that time integral is infinite or approximates to infinity. However, an actual scan line of an image display device has resistance and is capacitively coupled with an electrode of a display panel 10. In the embodiment of FIG. 21, a pulse wave is supplied to a scan line from a scan driver 30, but it is modified due to capacitance occurring through capacitive coupling with the resistance of the scan line.

In the reference numeral 302, for example, assuming that the resistance value of a line between any position P on a scan line and a scan driver 104 is R and a capacitance value of the position P determined by the capacitive coupling is C, a rise may vary with (1−EXP(−t/(CR))) at the position P. Also, R and C may increase as the position P becomes far away from the scan driver 104.

Figure 22:
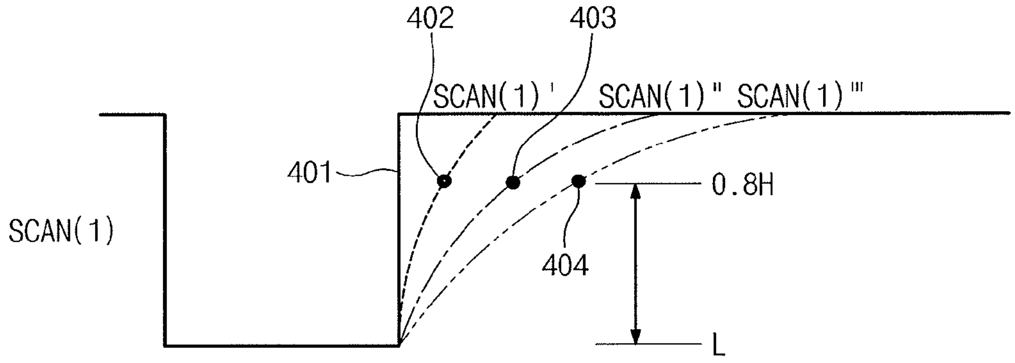
FIG. 22 illustrates an example of how a scan line signal changes based on distance from a scan driver.

Referring to FIG. 22, when a pulse waveform with a rise marked by reference numeral 401 is supplied to a scan line SCAN(1) from the scan driver 104, a signal supplied to a gate electrode of a transistor M2 of a pixel circuit corresponding to an intersection of the scan line SCAN(1) and a data line DT(1) changes, as indicated by a reference numeral 402. As indicated by reference numeral 403, a signal supplied to a gate electrode of a transistor M2 of a pixel circuit corresponding to an intersection of the scan line SCAN(1) and a data line DT(2) changes more smoothly. A signal supplied to a gate electrode of a transistor M2 of a pixel circuit corresponding to an intersection of the scan line SCAN(1) and a data line DT(3) changes even more smoothly as indicated by a reference numeral 404.

When the transistor M2 of each pixel circuit is turned off with 80% of a high level of a scan line signal, the transistor M2 of a pixel circuit at the intersection of the scan line SCAN(1) and a data signal line DT(1) is turned off at a point in time 402. The transistor M2 of a pixel circuit at the intersection of the scan line SCAN(1) and a data signal line DT(2) is turned off at a point in time 403. The transistor M2 of a pixel circuit at the intersection of the scan line SCAN(1) and a data signal line DT(3) is turned off at a point in time 404. Therefore, the point in time when a pixel circuit receives a gray scale data signal is increasingly delayed with increasing distance from a scan driver 104.

A large-scale panel 101 causes an increase in resistance of a scan line. A high-definition panel 101 causes an increase in a capacitive value due to the capacitive coupling of the scan line. Thus, the value of CR of (1−EXP(−t/(CR))) is greater, and the above-described delay increases due to the large-scale and high-definition panel 101.

In one embodiment, the timing of when a data driver 103 supplies a gray scale data signal to a data signal line is delayed according to a distance between the scan driver 104 and an intersection of the data signal line and corresponding scan line. Moreover, the timing for supplying a gray scale data signal to at least two data lines is adjusted. For example, the timing of when the data driver 103 provides a gray scale data signal to a data signal line may be delayed according to the number of data signal lines between the data signal line and the scan driver 104.

A delay time interval from a first point in time when a scan signal from the scan driver 104 goes to a high level up to a second point in time a gray scale data signal is supplied may monotonically increase according to a distance between the scan driver 104 and an intersection of a data signal line and a scan line, or according to the number of data signal lines between a data signal line and the scan driver 104. A monotonic increase may include not only narrow a monotonic increase but also a wide monotone increase.

Figure 23:
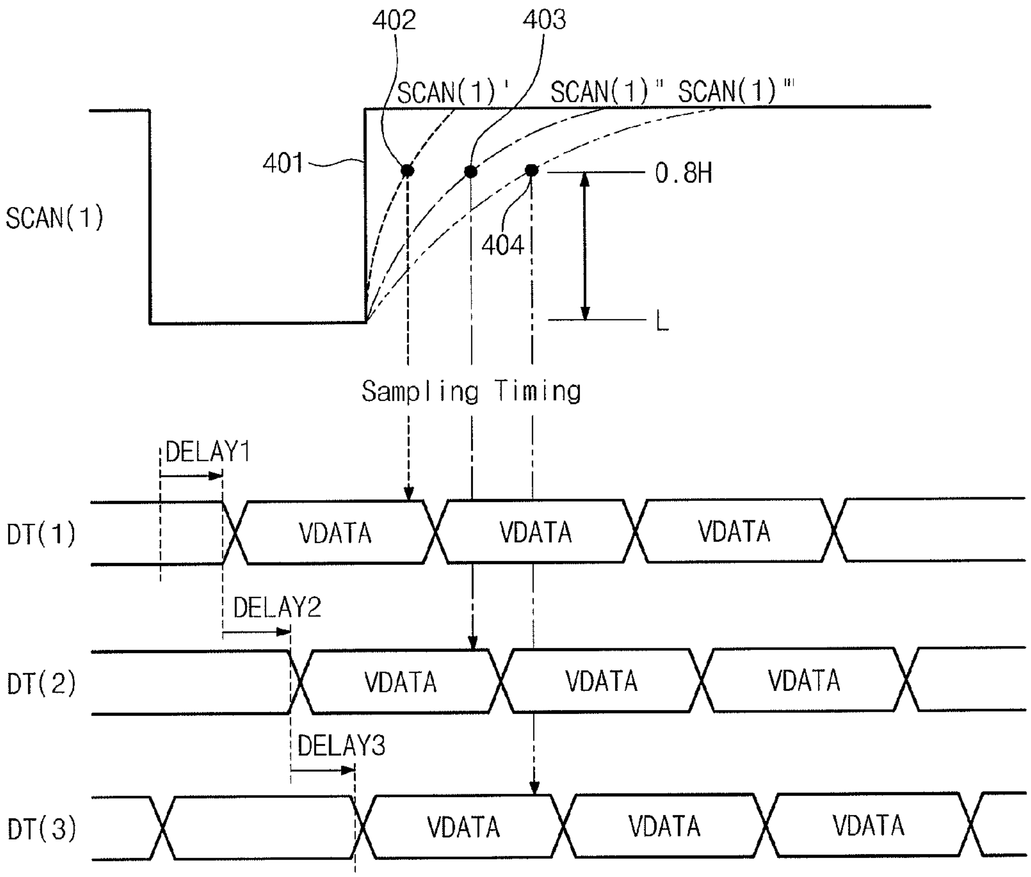
FIG. 23 illustrates a timing diagram for delaying timing when a gray scale data signal is supplied to a data signal line.

FIG. 23 illustrates an embodiment of a timing diagram for describing how to delay timing when a gray scale data signal is supplied to a data signal line. Referring to FIG. 23, the transistor M2 of a pixel circuit at an intersection of a scan line SCAN(1) and a data signal line DT(1) is turned off at a point in time 402. The transistor M2 of a pixel circuit at an intersection of the scan line SCAN(1) and a data signal line DT(2) is turned off at a point in time 403. The transistor M2 of a pixel circuit at an intersection of the scan line SCAN(1) and a data signal line DT(3) is turned off at a point in time 404.

If the time difference between the points in time 401 and 402 is DELAY1, the timing when a gray scale data signal is supplied to the data signal line DT(1) may be delayed as long as DELAY1. Likewise, when a time difference between the points in time 402 and 403 is DELAY2, the timing when a gray scale data signal is supplied to the data signal line DT(2) is delayed as long as DELAY2 from a point in time when a gray scale data signal is supplied to the data signal line DT(1). Moreover, when a time difference between the points in time 403 and 404 is DELAY3, the timing when a gray scale data signal is supplied to the data signal line DT(3) is delayed as long as DELAY3 from a point in time when a gray scale data signal is supplied to the data signal line DT(2).

Thus, even though a pulse transferred through a scan line SCAN(1) changes, pixel circuits connected to the scan line SCAN(1) may receive respective gray scale data signals. Thus, it is possible to display an intended image on an image display device.

Figure 24:
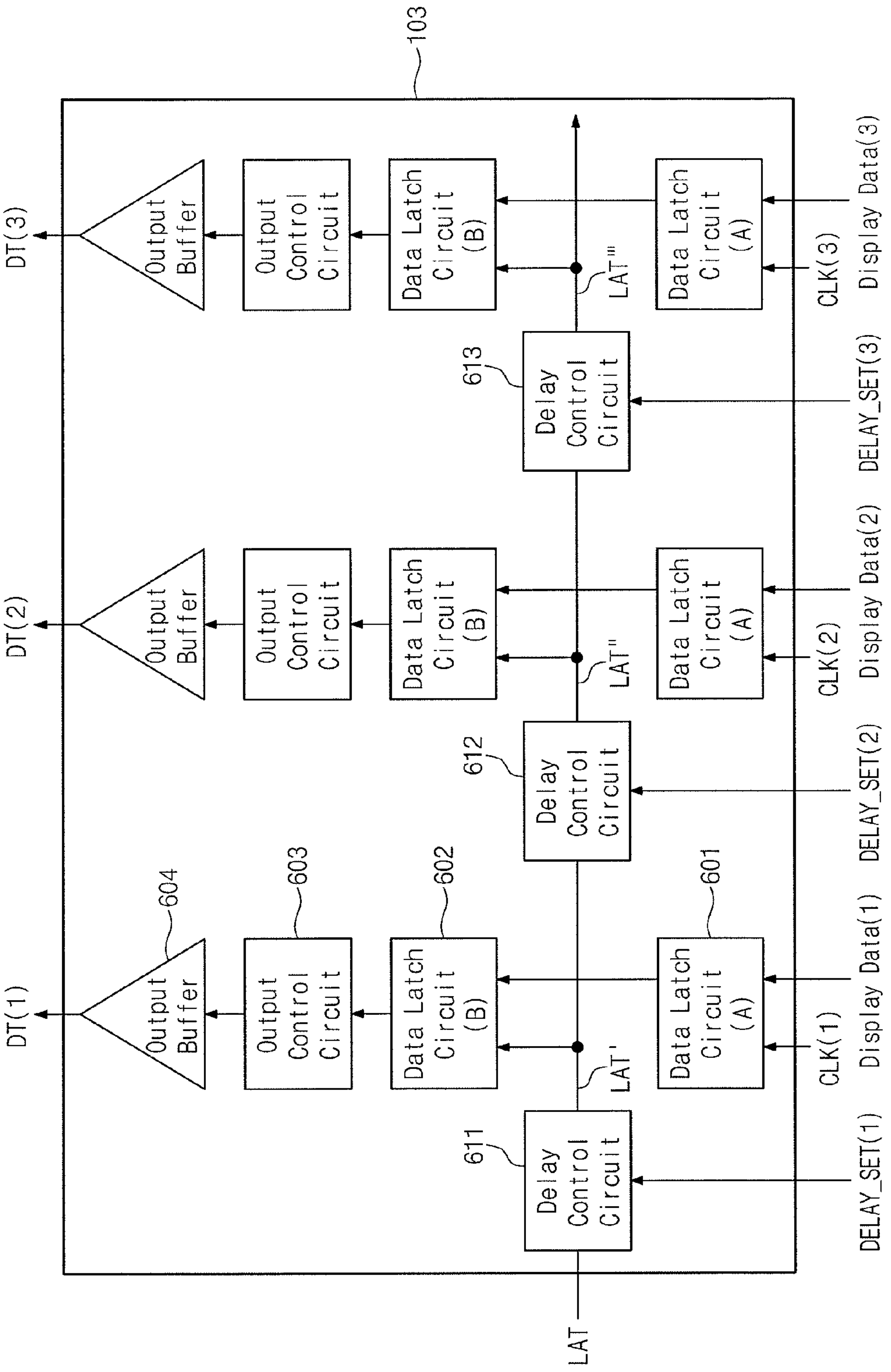
FIG. 24 illustrates another embodiment of a data driver.

FIG. 24 illustrates an embodiment of the data driver 103 which includes a data latch circuit (A) 601, a data latch circuit (B) 602, an output control circuit 603, and an output buffer 604, which corresponds to a data signal line DT(1). The same configuration may be provided with respect to other data signal lines.

The data latch circuit (A) 601 receives a clock signal CLK(1) and display data (1) to be displayed through a pixel circuit connected to a corresponding data signal line. The data latch circuit (A) 601 latches the display data (1) in response to the clock signal CLK(1). The display data (1) latched by the data latch circuit (A) 601 is provided to the next-stage data latch circuit (B) 602. The data latch circuit (B) 602 outputs the display data (1) to the data signal line DT(1) as a gray scale data signal through the output control circuit 603 and the output buffer 604 according to an output timing signal LAT'.

The output timing signal LAT' may be provided from an external source. Alternatively, the output timing signal LAT' may be a signal produced by delaying an output timing signal LAT, generated in the data driver 103, through the delay control circuit 611. The output timing signal LAT may be a signal synchronized, for example, with the scan driver 104 changing selection of a scan line. The output timing signal LAT may be used to output a gray scale data signal to a data signal line, assuming that a change or delay of a waveform does not occur when a pulse wave is supplied to a scan line.

As described above, because a waveform is changed or delayed when a pulse wave is supplied to a scan line, the delay control circuit 611 delays the scan signal as long as DELAY1 corresponding to a time interval from a low-to-high transition of a scan signal from the scan driver 105 up to a point in time when a transistor M2 of a pixel circuit connected to a data signal line DT(1) is turned off.

Likewise, to delay a gray scale data signal from a data signal line DT(2) as long as DELAYS2 on the basis of a gray scale data signal from the data signal line DT(1), an output timing signal LAT' is provided to a delay control circuit 612. The delay control circuit 612 outputs an output timing signal LAT" to a data latch circuit (B) 602 corresponding to the data signal line DT(2). An output timing signal LAT'" corresponding to a data signal line DT(3) may be produced in the same way by providing the output timing signal LAT" to a delay control circuit 613. For example, the delay control circuits 611, 612, and 613 may be connected in series to delay an output timing signal based on a distance between the scan driver 104 and a data line.

The delay time of each of the delay control circuits 611, 612, and 613 may be fixed to a value obtained by calculating a change of a waveform when a pulse wave is supplied to a scan line. For example, the delay time may be determined based on the time constant (e.g., the product of R and C). Also, the delay time of each of the delay control circuits 611, 612, and 613 may be variable.

Figure 25:
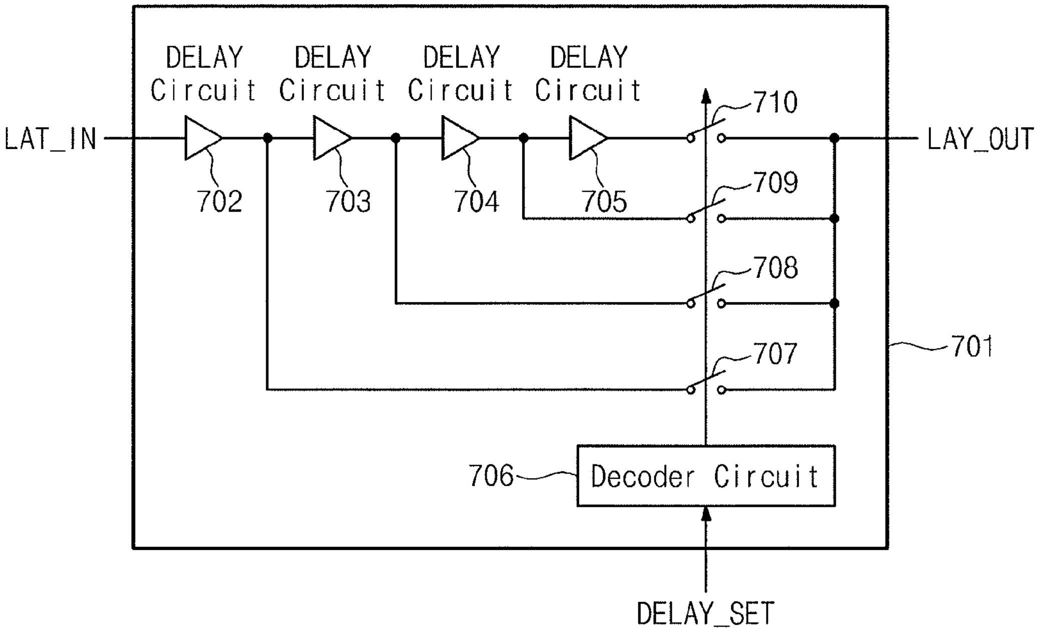
FIG. 25 illustrates an embodiment of a delay control circuit for a variable delay time.

FIG. 25 is a function block diagram of a delay control circuit 701 of which the delay time is variable, according to an embodiment of the inventive concept. A delay control circuit 701 has delay circuits 702, 703, 704, and 705 that are connected in series. Outputs of the delay circuits 702, 703, 704, and 705 are provided to one ends of switches 707, 708, 709, and 710, respectively. One of the switches 707, 708, 709, and 710 is selected by a control signal DELAY_SET. With this configuration, it is possible to select one of four delay times.

One reason of making it possible to change a delay time through each of the delay control circuits 611, 612, and 613 is to delay a pulse wave provided to a scan line because of delay of a gray scale data signal supplied to a data signal line. Therefore, it is possible to control length of a delay time through each of the delay control circuits 611, 612, and 613 according to a distance between a selected scan line and a data driver 103.

Figure 26:
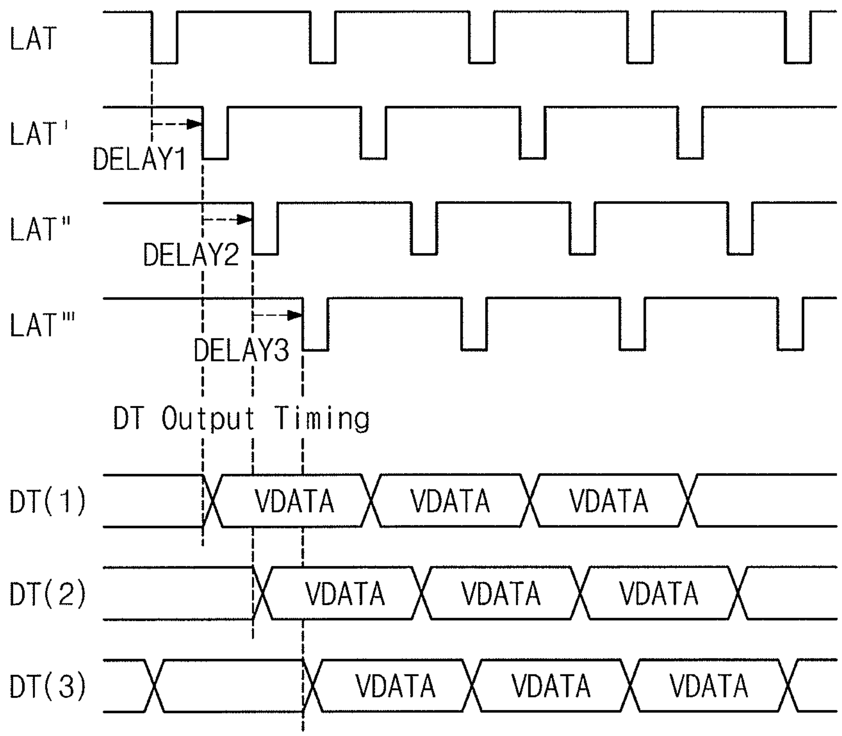
FIG. 26 illustrates an embodiment of a timing diagram of output timing signals and gray scale data signals in FIG. 24.

FIG. 26 is an example of a timing diagram of output timing signals and gray scale data signals in FIG. 24. An output timing signal LAT' is a signal produced by delaying an output timing signal LAT as long as DELAY1. An output of a gray scale data signal to a data signal line DT(1) is controlled by the output timing signal LAT'. Likewise, an output timing signal LAT" is a signal produced by delaying the output timing signal LAT' as long as DELAY2. An output of a gray scale data signal to a data signal line DT(2) is controlled by the output timing signal LAT". Moreover, an output timing signal LAT'" is a signal produced by delaying the output timing signal LAT" as long as DELAY3. An output of a gray scale data signal to a data signal line DT(3) is controlled by the output timing signal LAT'".

Figure 27:
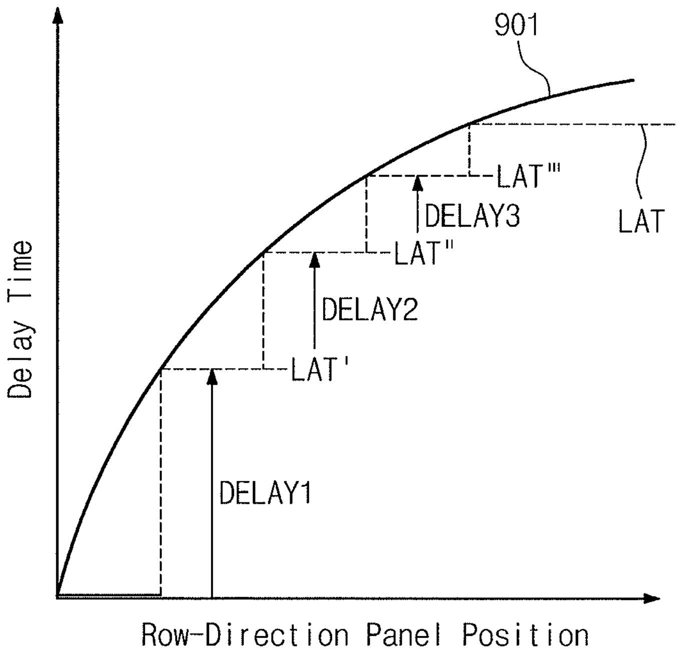
FIG. 27 illustrates an example of a relationship among delay times.

FIG. 27 illustrates an example of a relationship among delay times DELAY1, DELAY2, and DELAY3. The abscissa represents a row-direction panel position on a panel 101, e.g., a distance from a scan driver 104 in an extending direction of a scan line. The ordinate represents a delay time, e.g., a time required to turn off a transistor M2 of a pixel circuit from a point in time when a scan line signal output from the scan driver 104 and used to receive a gray scale data signal begins to change. The curve 901 is, for example, a curve based on $(1-EXP(-t/(CR)))$ obtained by setting values of R and C to predetermined (e.g., large) values with increasing row-direction panel position.

Referring to FIG. 27, DELAY1 indicates a delay time on a row-direction panel position of DT(1). DELAY2 is a value obtaining by subtracting the delay time DELAY1 from a delay time on a row-direction panel position of DT(2). DELAY3 is a value obtaining by subtracting the delay times DELAY1 and DELAY2 from a delay time on a row-direction panel position of DT(3). The point in time when a gray scale data signal is output to a data signal line is delayed by delaying a point in time when a pulse wave is provided to a scan line. Thus, it is possible to display an intended image.

In accordance with one embodiment, a data driver 103 and a scan driver 104 are disposed at one end of a panel 101. Alternatively, both or either of the data driver 103 and the scan driver 104 may be disposed at the same or different ends of the panel 101. In this case, when scan line signals are supplied to ends of a scan line from the scan drivers 104, a delay time does not monotonically increase according to distance from the scan driver 104 placed at one side. Instead, the delay time is increased, or maximized, at a center portion of the panel 101. In other embodiments, the delay time may be increased or maximized at other locations of the panel 101.

Figure 28:
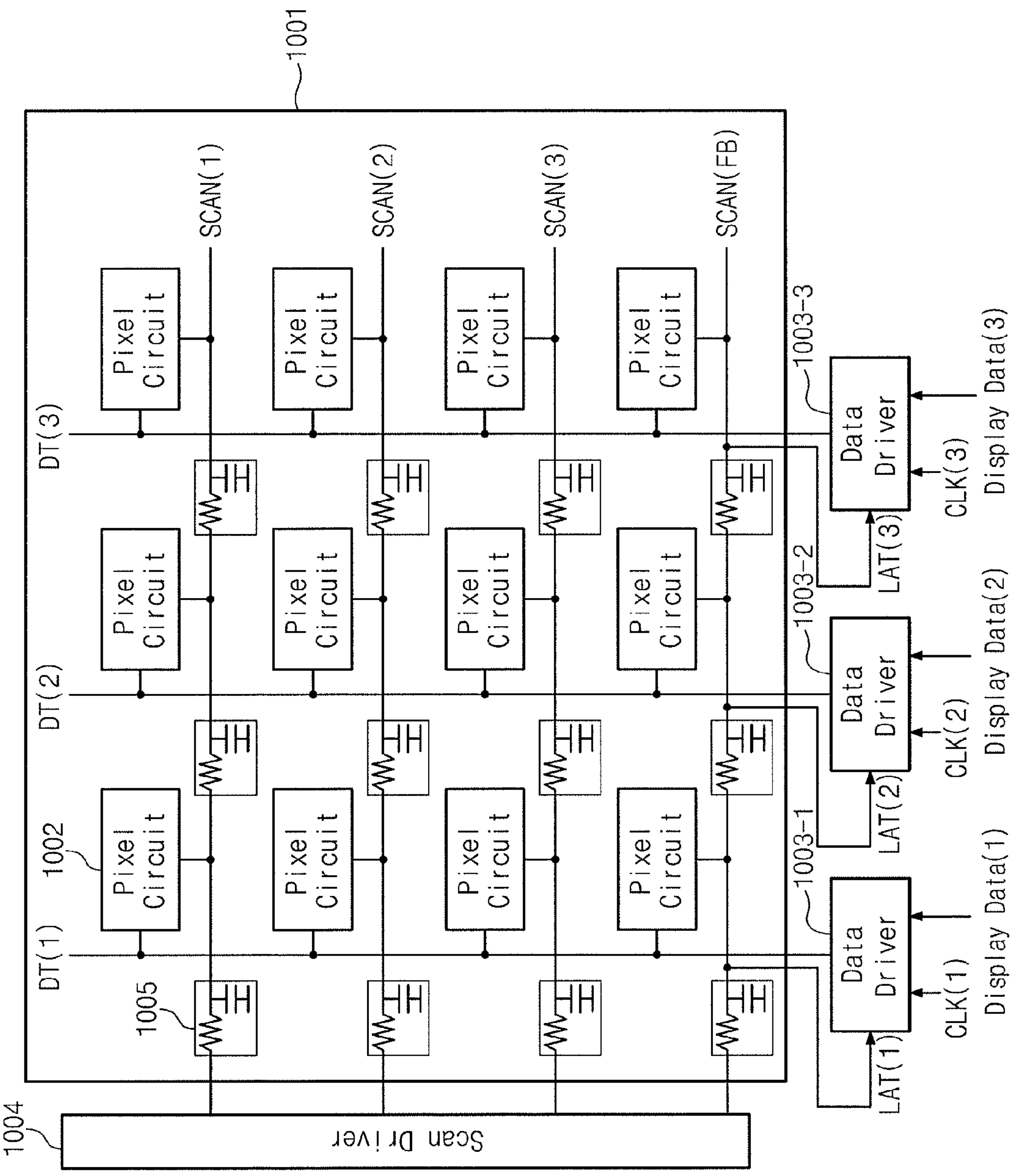
FIG. 28 illustrates another embodiment of a display device.

FIG. 28 illustrates another embodiment of a display device which includes a panel 1001, data drivers 1003-1, 1003-2, and 1003-3 as a data driver, and a scan driver 1004. A plurality of scan lines SCAN(1), SCAN(2), SCAN(3), and SCAN(FB) connected to the scan driver 1004 are disposed on the panel 1001. The data signal lines DT(1), DT(2), and DT(3) are on the panel and are connected to respective data drivers. The scan lines SCAN(1), SCAN(2), SCAN(3), and SCAN(FB) intersect the data signal lines DT(1), DT(2), and DT(3) intersect.

Pixel circuits 1002 are on the panel at locations corresponding to intersections of the scan lines SCAN(1), SCAN (2), SCAN(3), and SCAN(FB) and the data signal lines DT(1), DT(2), and DT(3). The pixel circuit 1002 is selected by a scan line and expresses a gray scale value in response to a gray scale data signal supplied to a data signal line.

Figure 29:
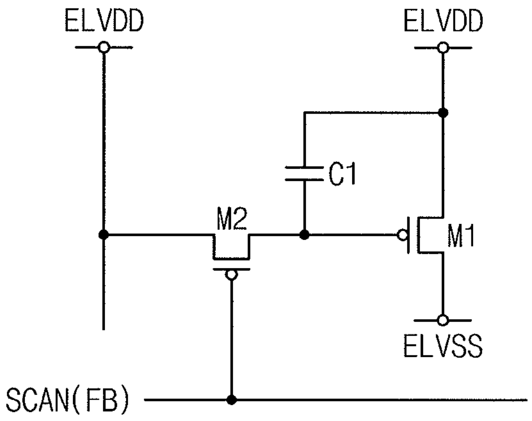
FIG. 29 illustrates an embodiment of a dummy pixel circuit.

Dummy pixel circuits are disposed at intersections of the data signal lines DT(1), DT(2), and DT(3) and a scan line SCAN(FB). The dummy pixel circuits do not express gray scale values of pixels. For example, as illustrated in FIG. 29, each dummy pixel circuit is different from that shown in FIG. 20, in that the dummy pixel circuits do not include organic EL elements. Thus, the scan line SCAN(FB) is used to determine a delay time when a pulse wave is supplied to a scan line.

For example, a scan line signal of SCAN(FB) is supplied to each data driver between the scan driver 1004 and a dummy pixel circuit at an intersection of SCAN(FB) and a data line connected to each data driver. With this configuration, each data driver produces an output timing signal based on an acquired scan line signal on SCAN(FB).

Figure 30:
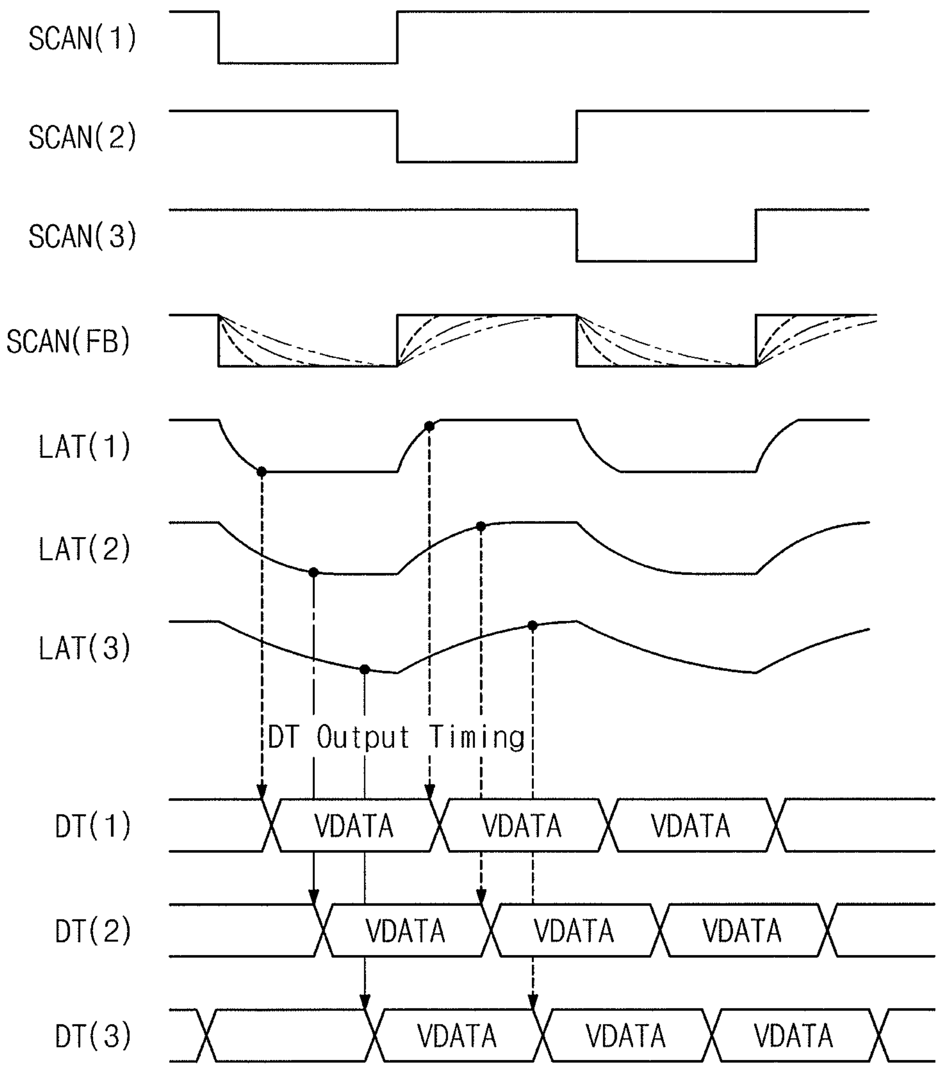
FIG. 30 illustrates an embodiment of a timing diagram for controlling each data driver to produce an output timing signal using a scan line signal.

FIG. 30 illustrates an example of a timing diagram for describing how each data driver produces an output timing signal using a scan line signal of SCAN(FB) supplied. As represented by a solid line of SCAN(FB) in FIG. 30, a pulse signal is supplied that has a high-level transition and a low-level transition at both or one of an increase or a decrease of a scan line signal to be supplied to scan lines SCAN(1), SCAN(2), and SCAN(3). A waveform of the pulse signal varies with distance from the scan driver due to a line resistance value of SCAN(FB) and a capacitance value determined by capacitive coupling.

LAT(1) indicates a scan line signal of SCAN(FB) supplied to a data driver 1003-1, and may have a waveform illustrated in FIG. 30. LAT(2) and LAT(3) indicate scan line signals of SCAN(FB) supplied to data drivers 1003-2 and 1003-3, respectively. Thus, gray scale data signals to be supplied to data signal lines DT(1), DT(2), and DT(3) are switched at timing when each of LAT(1), LAT(2), and LAT(3) has a predetermined level.

Figure 31:
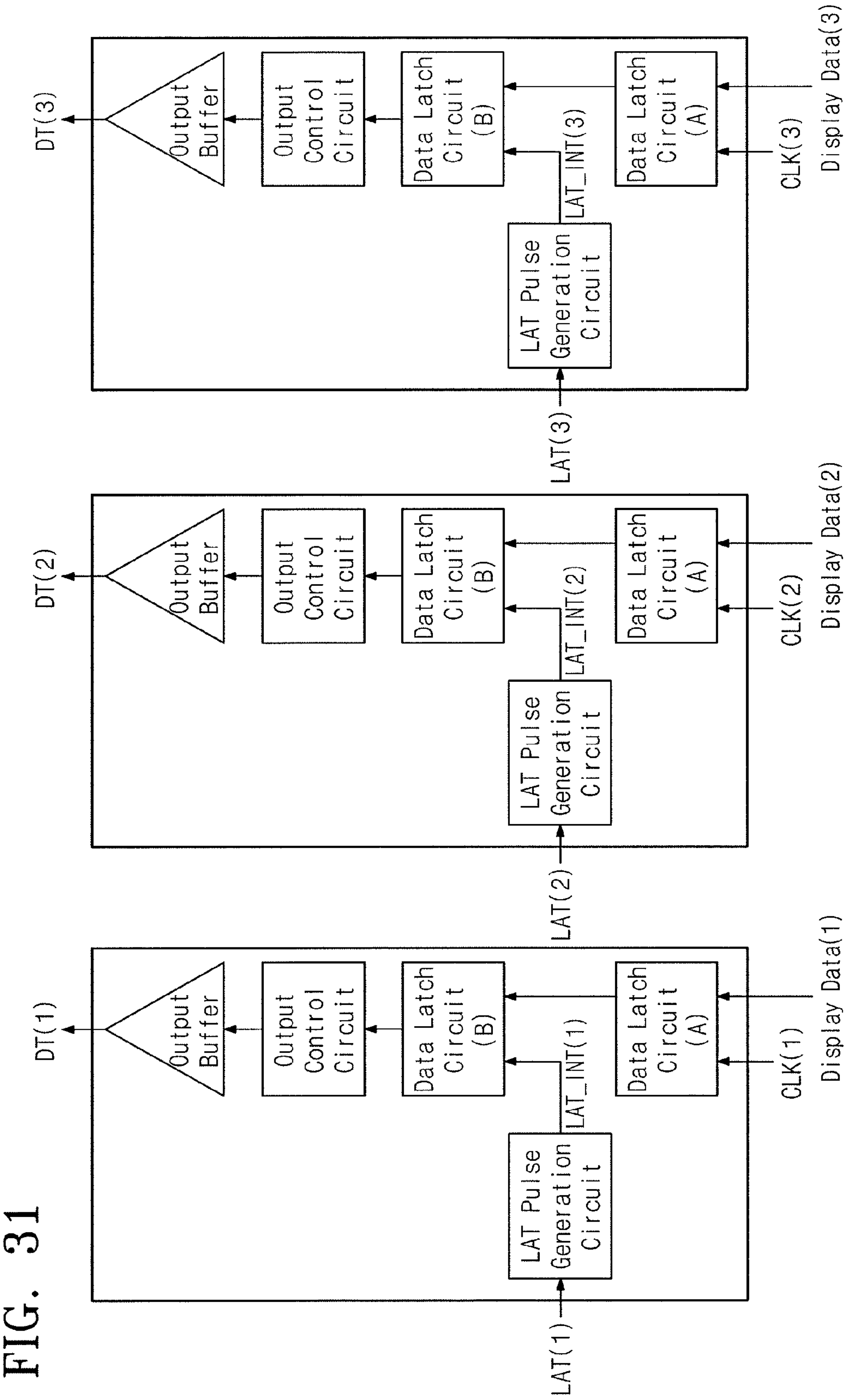
FIG. 31 illustrates an embodiment illustrating how data drivers generate output timing signals based on scan line signals.

FIG. 31 illustrates an example of how data drivers generate output timing signals LAT_INIT(1), LAT_INIT(2), and LAT_INIT(3), based on scan line signals LAT(1), LAT (2), LAT(3) acquired from a signal supplied to SCAN(FB). Each data driver includes an LAT pulse generation circuit, and LAT(1), LAT(2), and LAT(3) are provided to the data drivers, respectively. When a level of an input signal reaches a predetermined level, an LAT pulse generation circuit outputs a corresponding one of the output timing signals LAT_INIT(1), LAT_INIT(2), and LAT_INIT(3) to a data latch circuit (B).

Figure 32:
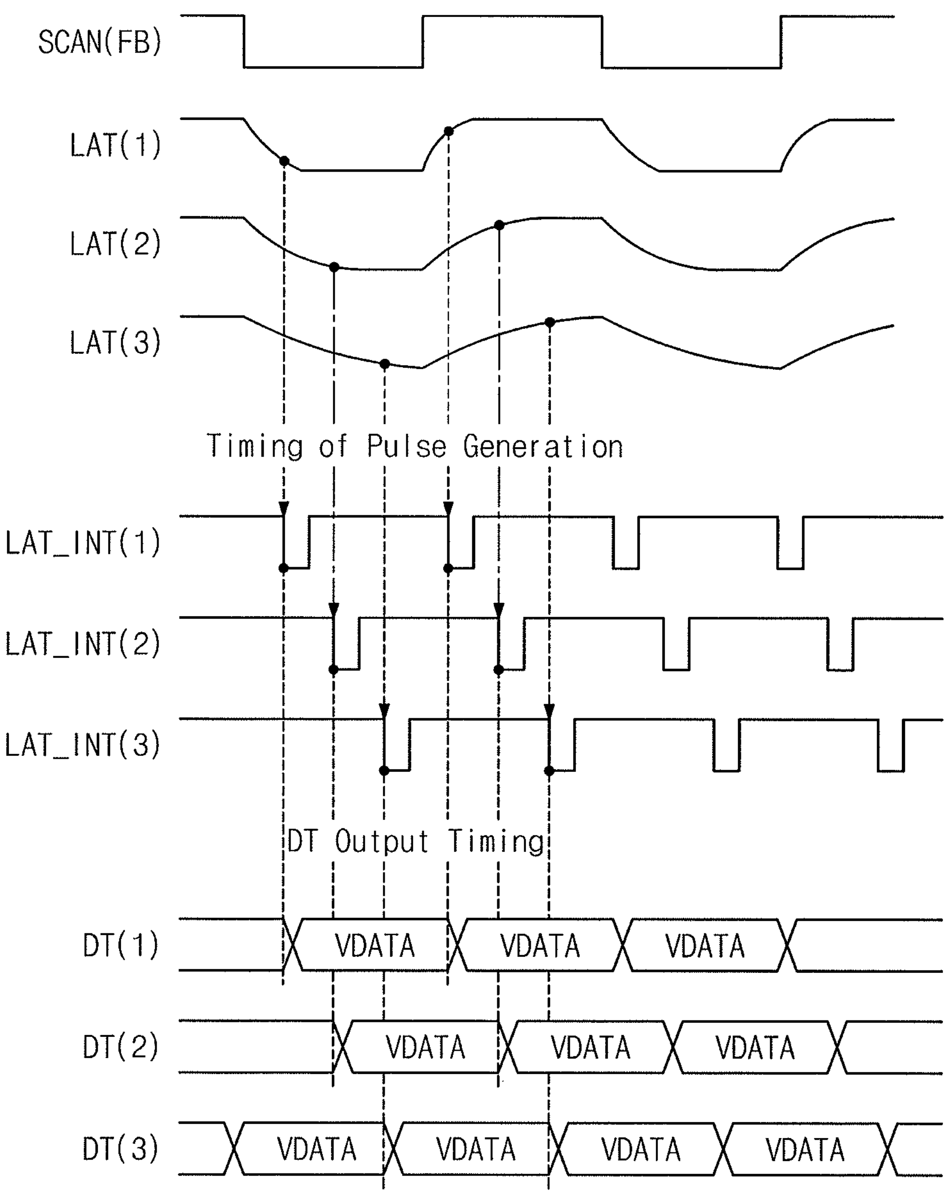
FIG. 32 illustrates an embodiment of a timing diagram based on a relationship among output timing signals.

FIG. 32 illustrates an example of a timing diagram showing a relationship among output timing signals LAT_INIT(1), LAT_INIT(2), and LAT_INIT(3) produced from signals LAT(1), LAT(2), and LAT(3) acquired from SCAN(FB). As illustrated in FIG. 32, timing when each of output timing signals LAT_INIT(1), LAT_INIT(2), and LAT_INIT(3) transitions to a low level is delayed according to a delay time when a pulse wave supplied to SCAN(FB) is modified and reaches a predetermined level. Thus, switching timing of gray scale data signals to be supplied to data signal lines DT(1), DT(2), and DT(3) are delayed.

In accordance with one embodiment, switching timing of gray scale data signals are delayed without using a delay control circuit, thereby making it possible to display an intended image. Also, this or another embodiment has a data driver and a scan driver disposed at least one end of a panel, e.g., both or either of the data and scan drivers are disposed at ends of the panel.

In accordance with these or other embodiments, a dummy pixel circuit is connected to SCAN(FB). Additionally, or alternatively, a dummy pixel circuit is provided which is similar to a pixel circuit connected to any other scan line. In this case, a pulse signal that transitions to a high level and to a low level at both or either of an increase or a decrease of a scan line signal to be supplied to scan lines SCAN(1), SCAN(2), and SCAN(3), as illustrated in FIG. 30, may not be applied to SCAN(FB), but a signal transitioning to a high level and a low level is applied only when SCAN(FB) is selected. In this case, to switch a gray scale data signal while SCAN(FB) is not selected, an output timing signal may be produced using a delay time that is stored in an LAT pulse generation circuit.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the present invention as set forth in the following claims.

What is claimed is:

1. A display device, comprising:

a circuit to acquire a first gray scale value for a pixel;

a calculator to calculate a first delay correction value corresponding to a level difference between the first gray scale value and a second gray scale value corresponding to a second gray scale voltage being currently retained on a data signal line to which the second gray scale voltage is output, the first gray scale value corresponding to a first gray scale voltage to be subsequently output to the data signal line; and a delay controller to determine a delay time of the first gray scale voltage by adjusting a timing when the first gray scale voltage is to be output to the data signal line according to the first delay correction value corresponding to the level difference between the first gray scale value and the second gray scale value.

2. The device as claimed in claim 1, wherein the calculator is to calculate a second delay correction value based on a position of a scan line corresponding to the pixel, wherein the delay controller is to determine the timing when the first gray scale voltage is output to the data signal line based on the first and second delay correction values.

3. The device as claimed in claim 2, wherein the calculator is to calculate the second delay correction value based on an RC time constant of the data signal line.

4. The device as claimed in claim 1, wherein:

the second gray scale voltage being currently retained on the data signal line is output to the data signal line in a second horizontal period, and the first gray scale voltage is output to the data signal line in a first horizontal period.

5. The device as claimed in claim 1, further comprising:

a pre-charge control circuit to output a pre-charge voltage to the data signal line before the first gray scale voltage is output to the data signal line, wherein the second gray scale voltage being currently retained on the data signal line corresponds to the pre-charge voltage.

6. A method for driving a display device, the method comprising:

acquiring a first gray scale value for a pixel;

calculating a first delay correction value corresponding to a level difference between the first gray scale value and a second gray scale value corresponding to a second gray scale voltage being currently retained on a data signal line to which the second gray scale voltage is output, the first gray scale value corresponding to a first gray scale voltage to be subsequently output to the data signal line; and determining a delay time of the first gray scale voltage by adjusting a timing when the first gray scale voltage is output to the data signal line according to the first delay correction value corresponding to the level difference between the first gray scale value and the second gray scale value.

7. The method as claimed in claim 6, further comprising:

calculating a second delay correction value based on a position of a scan line corresponding to the pixel to which the first gray scale voltage is output, wherein the timing when the first gray scale voltage is output to the data signal line is based on the first and second delay correction values.

8. The method as claimed in claim 7, wherein calculating the second delay correction value is performed based on an RC time constant of the data signal line.

9. The method as claimed in claim 6, wherein the second gray scale voltage being currently retained on the data signal line is output to the data signal line in a second horizontal period, and the first gray scale voltage is output to the data signal line in a first horizontal period.

10. The method as claimed in claim 6, further comprising:

outputting a pre-charge voltage to the data signal line before the first gray scale voltage is output to the data signal line, wherein the second gray scale voltage being currently retained on the data signal line corresponds to the pre-charge voltage.

11. A method for driving an image display device including a scan line connected to a scan driver and at least two data lines connected to a data driver, the at least two data lines arranged to intersect the scan line, the method comprising:

delaying timings when gray scale data signals are respectively supplied to the at least two data lines based on a distance between the scan driver and each of the at least two data lines, wherein the timings are delayed by different amounts.

12. The method as claimed in claim 11, wherein delaying the timings when the gray scale data signals are respectively provided to the at least two data lines includes delaying the timing based on a time constant, wherein the time constant is based on a resistance value of the scan line and a capacitance value due to capacitive coupling.

13. The method as claimed in claim 11, wherein:

the timings are delayed by the data driver including a plurality of delay control circuits connected in series, and the method includes determining an output timing signal indicating a timing when a gray scale data signal is supplied to each of the at least two data lines, the output timing signal determined by one of the delay control circuits.

14. The method as claimed in claim 13, wherein the one of the delay control circuits selects a delay time of an output signal to an input signal.

15. The method as claimed in claim 11, further comprising:

providing a dummy scan line, intersecting the at least two data lines, with a pulse signal which ascends and descends according to an ascending transition and a descending transition of a selection signal supplied to the scan line, acquiring a signal on the dummy scan line between the scan driver and an intersection of the dummy scan line and each of the at least two data lines, and determining a timing when a gray scale data signal is supplied to each of the at least two data lines according to a level variation in the signal.

16. An image display device, comprising:

a scan line connected to a scan driver; and a data driver connected to at least two data lines, the at least two data lines arranged to intersect the scan line, wherein the data driver is to delay timings when gray scale data signals are respectively supplied to the at least two data lines based on a distance between the scan driver and each of the at least two data lines, and wherein the data driver is to delay the timings by different amounts.

17. An apparatus, comprising:

a calculator to calculate a first delay correction value corresponding to a level difference between a first gray scale value and a second gray scale value, the second gray scale value corresponding to a second gray scale voltage being currently retained on a data signal line, the first gray scale value corresponding to a first gray scale voltage to be subsequently output to the data signal line; and a controller to determine a delay time of the first gray scale voltage by adjusting a timing when the first gray scale voltage is to be output to the data signal line according to the first delay correction value corresponding to the level difference between the first gray scale value and the second gray scale value, wherein the gray scale voltage corresponds to a gray scale value of light to be emitted from a pixel connected to the data signal line.

18. The apparatus as claimed in claim 17, wherein the calculator is to calculate a second delay correction value based on a position of a scan line corresponding to the pixel, wherein the controller determines the timing when the first gray scale voltage is to be output to the data signal line based on the first and second delay correction values.

19. The apparatus as claimed in claim 18, wherein the calculator is to calculate the second delay correction value based on an RC time constant of the data signal line.

20. The apparatus as claimed in claim 17, further comprising:

a pre-charge control circuit to output a pre-charge voltage to the data signal line before the first gray scale voltage is output, wherein the second gray scale voltage being currently retained on the data signal line corresponds to the pre-charge voltage.

* * * * *